United States Patent
Jia et al.

(10) Patent No.: US 12,224,903 B2
(45) Date of Patent: Feb. 11, 2025

(54) ACCELERATION RESOURCE SCHEDULING METHOD AND APPARATUS, AND ACCELERATION SYSTEM

(71) Applicant: Huawei Technologies Co., Ltd., Shenzhen (CN)

(72) Inventors: Xiaolin Jia, Hangzhou (CN); Junjie Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 138 days.

(21) Appl. No.: 17/738,218

(22) Filed: May 6, 2022

(65) Prior Publication Data

US 2022/0263711 A1  Aug. 18, 2022

Related U.S. Application Data

(63) Continuation of application No. 15/930,780, filed on May 13, 2020, now Pat. No. 11,336,521, which is a
(Continued)

(51) Int. Cl.
*G06F 9/455* (2018.01)
*G06F 9/50* (2006.01)
(Continued)

(52) U.S. Cl.
CPC ........ *H04L 41/083* (2013.01); *G06F 9/45558* (2013.01); *G06F 9/5072* (2013.01);
(Continued)

(58) Field of Classification Search
CPC .. G06F 9/5072; G06F 9/45558; G06F 9/5077; G06F 2009/45595;
(Continued)

(56) References Cited

U.S. PATENT DOCUMENTS 8,046,550 B2 * 10/2011 Feathergill .......... G06F 11/1466
                                                                718/1
9,576,332 B1 * 2/2017 Streete ...................... G06T 1/20
(Continued)

FOREIGN PATENT DOCUMENTS

| CN | 102915285 A | 2/2013 |
| CN | 103905508 A | 7/2014 |

(Continued)

OTHER PUBLICATIONS

Sengupta, D., et al., "Scheduling Multi-tenant Cloud Workloads on Accelerator-based Systems," SC 14: Proceedings of the International Conference for High Performance Computing, Networking, Storage and Analysis, Nov. 2014, 12 pages.
(Continued)

*Primary Examiner* — Sisley N Kim
(74) *Attorney, Agent, or Firm* — Conley Rose, P.C.

(57) ABSTRACT

An acceleration resource scheduling method includes: receiving an acceleration instruction sent by the virtual machine, where the acceleration instruction includes to-be-accelerated data; determining a virtual accelerator allocated to the virtual machine; determining, based on the virtual accelerator, a network accelerator that is to process the acceleration instruction, and sending the acceleration instruction to the network accelerator, so that the network accelerator sends the acceleration instruction to a physical accelerator that is to process the acceleration instruction; receiving a computing result that is returned after the physical accelerator performs acceleration computing on the to-be-accelerated data by using the physical acceleration resource; and sending the computing result to the virtual machine.

28 Claims, 10 Drawing Sheets

Related U.S. Application Data continuation of application No. PCT/CN2017/111147, filed on Nov. 15, 2017.

(51) Int. Cl.
*H04L 41/0266* (2022.01)
*H04L 41/083* (2022.01)
*H04L 67/1001* (2022.01)

(52) U.S. Cl.
CPC ........ *G06F 9/5077* (2013.01); *H04L 41/0266* (2013.01); *H04L 67/1001* (2022.05); *G06F 2009/45595* (2013.01); *G06F 2209/505* (2013.01); *G06F 2209/509* (2013.01)

(58) Field of Classification Search
CPC ........ G06F 2209/505; G06F 2209/509; H04L 41/0266; H04L 67/1001
See application file for complete search history.

(56) References Cited

U.S. PATENT DOCUMENTS

| | | | |
|---|---|---|---|
| 10,210,133 | B2 | 2/2019 | Anumula et al. |
| 10,892,944 | B2 | 1/2021 | Schardt et al. |
| 2011/0010721 | A1 | 1/2011 | Gupta et al. |
| 2011/0161955 | A1 | 6/2011 | Woller et al. |
| 2011/0320523 | A1 | 12/2011 | Chan et al. |
| 2011/0320804 | A1 | 12/2011 | Chan et al. |
| 2012/0154389 | A1 | 6/2012 | Bohan et al. |
| 2013/0067468 | A1 | 3/2013 | Tillier et al. |
| 2014/0006477 | A1 | 1/2014 | Drahzal et al. |
| 2015/0007182 | A1* | 1/2015 | Rossbach .............. G06F 9/4843 718/102 |
| 2015/0058614 | A1 | 2/2015 | Degenaro et al. |
| 2015/0089495 | A1 | 3/2015 | Persson et al. |
| 2016/0321113 | A1* | 11/2016 | Pinto ................... G06F 9/45558 |
| 2017/0039089 | A1 | 2/2017 | Xia et al. |
| 2017/0147409 | A1* | 5/2017 | Chandrakar ........ G06F 9/45541 |
| 2017/0371694 | A1 | 12/2017 | Kim |
| 2018/0210752 | A1* | 7/2018 | Tang ...................... G06F 9/467 |
| 2019/0007334 | A1 | 1/2019 | Guim Bernat et al. |
| 2019/0129874 | A1 | 5/2019 | Huang et al. |
| 2020/0174840 | A1 | 6/2020 | Zhao et al. |
| 2020/0274755 | A1 | 8/2020 | Jia et al. |
| 2020/0285467 | A1 | 9/2020 | Jin |
| 2021/0073047 | A1 | 3/2021 | Bhandaru et al. |

FOREIGN PATENT DOCUMENTS

| | | | |
|---|---|---|---|
| CN | 104156663 | A | 11/2014 |
| CN | 105159753 | * | 9/2015 |
| CN | 105159753 | A | 12/2015 |
| CN | 105979007 | A | 9/2016 |
| CN | 106572500 | A | 4/2017 |
| CN | 106681793 | A | 5/2017 |
| JP | 2013516021 | A | 5/2013 |
| JP | 2014504409 | A | 2/2014 |
| WO | 2016149892 | A1 | 9/2016 |
| WO | 2017049945 | A1 | 3/2017 |

OTHER PUBLICATIONS

ETSI GS NFV-IFA 002 V2.1.1, "Network Functions Virtualisation (NFV); Acceleration Technologies; VNF Interfaces Specification," XP014274005, Mar. 2016, 30 pages.

Yi Cao et al.,"A Distributed Multi-Node GPU Accelerated Parallel Rendering Scheme for Visualization Cluster Environment",2013 International Conference on Virtual Reality and Visualization,total 8 pages.

Zhang Han-bo et al.,"Research on performance optimization of docker virtualization technology based on RBD", Information Technology,2016,with an English abstract, total 5 pages.

* cited by examiner

ACCELERATION RESOURCE SCHEDULING METHOD AND APPARATUS, AND ACCELERATION SYSTEM

CROSS-REFERENCE TO RELATED APPLICATIONS

This is a continuation of U.S. patent application Ser. No. 15/930,780 filed on May 13, 2020, which is a continuation of Int'l Patent App. No. PCT/CN2017/111147 filed on Nov. 15, 2017, both of which are incorporated by reference.

TECHNICAL FIELD

This disclosure relates to the field of computer technologies, and in particular, to an acceleration resource scheduling method and apparatus, and an acceleration system.

BACKGROUND

A requirement for a computing capability of a computing node becomes increasingly high with an explosive increase of client applications and data. A computing capability of a general-purpose central processing unit (CPU) cannot meet a demand for high performance computing of rapid development of a current service. Therefore, heterogeneous computing that can economically and effectively obtain a high performance computing capability and has high scalability, high computing resource utilization, and tremendous development potential rises to the occasion. However, services of different enterprises usually require different heterogeneous computing capabilities. For example, different enterprises have different selections in aspects of types and granularities of heterogeneous acceleration capabilities.

In some approaches, a heterogeneous acceleration solution dedicated to a graphics processing unit (GPU) is provided. A computing node accesses and uses a GPU resource on a server in a client-server manner. However, a virtual machine (VM) in the computing node cannot access or use the GPU resource on the server, and virtualization of all GPU resources on the server cannot be implemented either.

SUMMARY

An objective of embodiments of this disclosure is to provide an acceleration resource scheduling method and apparatus, and an acceleration system, in the expectation of implementing heterogeneous computing of a virtual machine in a scenario of heterogeneous acceleration resource virtualization, and improving computing performance of the virtual machine.

According to a first aspect, an embodiment provides an acceleration resource scheduling method, applied to an acceleration system, where the acceleration system includes a computing node and at least one network accelerator, the computing node includes a virtual machine and a scheduling apparatus, and the network accelerator includes at least one physical accelerator. The method is performed by the scheduling apparatus, and includes: The scheduling apparatus receives an acceleration instruction sent by the virtual machine, where the acceleration instruction includes to-be-accelerated data. Then, the scheduling apparatus determines a virtual accelerator allocated to the virtual machine, where the virtual accelerator is mapping, on the scheduling apparatus, of a physical acceleration resource allocated to the virtual machine, and the physical acceleration resource includes at least some physical acceleration resources in the at least one physical accelerator in the at least one network accelerator. The scheduling apparatus determines, based on the virtual accelerator, a network accelerator that is to process the acceleration instruction, and sends the acceleration instruction to the network accelerator, so that the network accelerator can send the acceleration instruction to a physical accelerator that is to process the acceleration instruction. After the physical accelerator processes the acceleration instruction, the scheduling apparatus receives a computing result that is returned after the physical accelerator performs acceleration computing on the to-be-accelerated data by using the physical acceleration resource, and sends the computing result to the virtual machine.

Based on the foregoing acceleration resource scheduling method, after an acceleration resource provided by the at least one network accelerator in a cloud is virtualized, the virtual machine corresponds to a virtual accelerator, so as to present, to the virtual machine, an acceleration resource provided for the virtual accelerator. The VM directly accesses a corresponding virtual accelerator to implement access of the virtual machine to the physical acceleration resource in the cloud, thereby implementing heterogeneous computing of the virtual machine in a scenario of heterogeneous acceleration resource virtualization. The virtual accelerator is the mapping, on the scheduling apparatus, of the physical acceleration resource allocated to the virtual machine, the physical acceleration resource includes the at least some physical acceleration resources in the at least one physical accelerator in the at least one network accelerator, and a physical acceleration resource provided in the cloud is allocated to the virtual machine.

In a possible implementation, the determining, by the scheduling apparatus based on the virtual accelerator, a network accelerator that is to process the acceleration instruction includes: determining, by the scheduling apparatus, an object accelerator corresponding to the virtual accelerator, where a network accelerator at which the object accelerator is located is the network accelerator that is to process the acceleration instruction; and after the determining, by the scheduling apparatus based on the virtual accelerator, a network accelerator that is to process the acceleration instruction, the method further includes: sending, by the scheduling apparatus, an identifier of the object accelerator to the network accelerator, so that the network accelerator determines, based on the identifier of the object accelerator, a physical accelerator corresponding to the object accelerator, and sends the acceleration instruction to the physical accelerator. Hierarchical management of mapping of the physical acceleration resources on the scheduling apparatus is implemented through mapping between the virtual accelerator and the object accelerator and mapping between the object accelerator and the physical accelerator, and this helps to simplify maintenance of the mapping of the physical acceleration resources on the scheduling apparatus.

In a possible implementation, the determining, based on the virtual accelerator, a network accelerator that is to process the acceleration instruction includes: determining a physical accelerator corresponding to the virtual accelerator, where a network accelerator at which the physical accelerator is located is the network accelerator that is to process the acceleration instruction; and after the determining, based on the virtual accelerator, a network accelerator that is to process the acceleration instruction, the method further includes: sending an identifier of the physical accelerator to the network accelerator, so that the network accelerator sends the acceleration instruction to the physical accelerator based on the identifier of the physical accelerator.

In a possible implementation, before the receiving an acceleration instruction sent by the virtual machine, the method further includes: receiving a virtual accelerator application command sent by a management node, where the virtual accelerator application command includes the identifier of the object accelerator and an identifier of the virtual machine; if it is determined that there is no virtual accelerator corresponding to the virtual machine, creating a virtual accelerator corresponding to the virtual machine, and allocating an identifier to the virtual accelerator; and storing a correspondence between the identifier of the virtual accelerator and the identifier of the object accelerator. In-service mounting of the physical acceleration resources of the virtual machine can be implemented through mapping between the object accelerator and the virtual accelerator.

In a possible implementation, before the receiving an acceleration instruction sent by the virtual machine, the method further includes: receiving a virtual accelerator application command sent by a management node, where the virtual accelerator application command includes the identifier of the physical accelerator and an identifier of the virtual machine; if it is determined that there is no virtual accelerator corresponding to the virtual machine, creating a virtual accelerator corresponding to the virtual machine, and allocating an identifier to the virtual accelerator; and storing a correspondence between the identifier of the virtual accelerator and the identifier of the physical accelerator. In-service mounting of the physical acceleration resources of the virtual machine can be implemented through mapping between the physical accelerator and the virtual accelerator.

In a possible implementation, the method further includes: receiving a virtual accelerator application command sent by the management node, where the virtual accelerator application command includes the identifier of the object accelerator and an identifier of the virtual machine; if it is determined that there is a virtual accelerator corresponding to the virtual machine, determining whether all object accelerators corresponding to the virtual accelerator include an object accelerator indicated by the identifier of the object accelerator; and if it is determined that none of the object accelerators corresponding to the virtual accelerator include the object accelerator indicated by the identifier of the object accelerator, storing a mapping relationship between the virtual accelerator and the identifier of the object accelerator. In-service updating of the physical acceleration resources of the virtual machine can be implemented through mapping between the object accelerator and the virtual accelerator.

In a possible implementation, the method further includes: receiving a virtual accelerator application command sent by the management node, where the virtual accelerator application command includes the identifier of the physical accelerator and an identifier of the virtual machine; if it is determined that there is a virtual accelerator corresponding to the virtual machine, determining whether all physical accelerators corresponding to the virtual accelerator include a physical accelerator indicated by the identifier of the physical accelerator; and if it is determined that none of the physical accelerators corresponding to the virtual accelerator include the physical accelerator indicated by the identifier of the physical accelerator, storing a mapping relationship between the virtual accelerator and the identifier of the physical accelerator. In-service updating of the physical acceleration resources can be implemented through mapping between the physical accelerator and the virtual accelerator.

In a possible implementation, the method further includes: receiving an object accelerator deletion command sent by the management node, where the object accelerator deletion command includes the identifier of the virtual machine and the identifier of the object accelerator; if it is determined that there is a virtual accelerator corresponding to the virtual machine, determining, by the scheduling apparatus based on the identifier of the object accelerator, whether all object accelerators corresponding to the virtual accelerator include an object accelerator indicated by the identifier of the object accelerator; and if it is determined that all the object accelerators corresponding to the virtual accelerator include the object accelerator indicated by the identifier of the object accelerator, deleting the identifier of the object accelerator. In-service unmounting of the physical acceleration resources can be implemented through mapping between the object accelerator and the virtual accelerator.

In a possible implementation, the method further includes: receiving a physical accelerator deletion command sent by the management node, where the physical accelerator deletion command includes the identifier of the virtual machine and the identifier of the physical accelerator; if it is determined that there is a virtual accelerator corresponding to the virtual machine, determining, by the scheduling apparatus based on the identifier of the physical accelerator, whether all physical accelerators corresponding to the virtual accelerator include a physical accelerator indicated by the identifier of the physical accelerator; and if it is determined that all the physical accelerators corresponding to the virtual accelerator include the physical accelerator indicated by the identifier of the physical accelerator, deleting the identifier of the physical accelerator. In-service unmounting of the physical acceleration resources can be implemented through mapping between the physical accelerator and the virtual accelerator.

In a possible implementation, the acceleration instruction further includes the identifier of the virtual machine, and the scheduling apparatus pre-stores a correspondence between the identifier of the virtual machine and the identifier of the virtual accelerator; and the determining a virtual accelerator allocated to the virtual machine includes: determining, based on the correspondence between the identifier of the virtual machine and the identifier of the virtual accelerator, the virtual accelerator corresponding to the virtual machine.

In a possible implementation, the acceleration instruction further includes the identifier of the virtual accelerator, and the virtual machine pre-stores a correspondence between the identifier of the virtual machine and the identifier of the virtual accelerator; and the determining a virtual accelerator allocated to the virtual machine includes: determining, based on the identifier of the virtual accelerator, the virtual accelerator corresponding to the virtual machine.

According to a second aspect, an embodiment provides an acceleration resource scheduling method, applied to an acceleration system, where the acceleration system includes a management node, a computing node, and at least one network accelerator, the computing node includes a virtual machine and a scheduling apparatus, and the network accelerator includes at least one physical accelerator; and the method is performed by the management node, and includes: receiving an acceleration resource application request sent by the virtual machine, where the acceleration resource application request includes an identifier of the virtual machine, a quantity of required physical acceleration resources allocated to the virtual machine, and a type identifier of a physical accelerator that provides the physical acceleration resource for the virtual machine; determining, based on the type identifier of the physical accelerator and the quantity of the required physical acceleration resources, each network accelerator to which the at least one physical accelerator that provides the physical acceleration resource belongs; generating a physical acceleration resource creation command, where the physical acceleration resource creation command is used to instruct the network accelerator to create an object accelerator, and store a correspondence between an identifier of the object accelerator and an identifier of a physical accelerator that is in the network accelerator and that is configured to provide a physical acceleration resource for the virtual machine; sending the physical acceleration resource creation command to the network accelerator; receiving the identifier of the object accelerator that is sent by the network accelerator; generating a virtual accelerator application command, where the virtual accelerator application command includes the identifier of the virtual machine and the identifier of the object accelerator; and sending the virtual accelerator application command to the scheduling apparatus, so that the scheduling apparatus stores a correspondence between an identifier of a virtual accelerator and the identifier of the object accelerator based on the virtual accelerator application command.

According to a third aspect, an embodiment provides an acceleration resource scheduling method, applied to an acceleration system, where the acceleration system includes a management node, a computing node, and at least one network accelerator, the computing node includes a virtual machine and a scheduling apparatus, and the network accelerator includes at least one physical accelerator; and the method is performed by the management node, and includes: receiving an acceleration resource application request sent by the virtual machine, where the acceleration resource application request includes an identifier of the virtual machine, a quantity of required physical acceleration resources allocated to the virtual machine, and a type identifier of a physical accelerator that provides the physical acceleration resource for the virtual machine; determining, based on the type identifier of the physical accelerator and the quantity of the required physical acceleration resources, each network accelerator to which the at least one physical accelerator that provides the physical acceleration resource belongs; generating a virtual accelerator application command, where the virtual accelerator application command includes the identifier of the virtual machine and an identifier of a physical accelerator that is in each network accelerator and that is configured to provide a physical acceleration resource for the virtual machine; and sending the virtual accelerator application command to the scheduling apparatus, so that the scheduling apparatus stores, based on the virtual accelerator application command, a correspondence between an identifier of a virtual accelerator and the identifier of the physical accelerator that is in each network accelerator and that is configured to provide the physical acceleration resource for the virtual machine.

According to a fourth aspect, an embodiment provides a scheduling apparatus, applied to an acceleration system, where the acceleration system includes a computing node and at least one network accelerator, the computing node includes a virtual machine and the scheduling apparatus, and the network accelerator includes at least one physical accelerator; and the scheduling apparatus includes: a transceiver unit configured to receive an acceleration instruction sent by the virtual machine, where the acceleration instruction includes to-be-accelerated data; and a processing unit configured to: determine a virtual accelerator allocated to the virtual machine, where the virtual accelerator is mapping, on the scheduling apparatus, of a physical acceleration resource allocated to the virtual machine, and the physical acceleration resource includes at least some physical acceleration resources in the at least one physical accelerator in the at least one network accelerator; and determine, based on the virtual accelerator, a network accelerator that is to process the acceleration instruction, and send the acceleration instruction to the network accelerator, so that the network accelerator sends the acceleration instruction to a physical accelerator that is to process the acceleration instruction, where the transceiver unit is further configured to: receive a computing result that is returned after the physical accelerator performs acceleration computing on the to-be-accelerated data by using the physical acceleration resource; and send the computing result to the virtual machine.

In a possible implementation, when determining, based on the virtual accelerator, the network accelerator that is to process the acceleration instruction, the processing unit is further configured to: determine an object accelerator corresponding to the virtual accelerator, where a network accelerator at which the object accelerator is located is the network accelerator that is to process the acceleration instruction; and after determining, based on the virtual accelerator, the network accelerator that is to process the acceleration instruction, the processing unit is further configured to: send an identifier of the object accelerator to the network accelerator, so that the network accelerator determines, based on the identifier of the object accelerator, a physical accelerator corresponding to the object accelerator, and sends the acceleration instruction to the physical accelerator.

In a possible implementation, when determining, based on the virtual accelerator, the network accelerator that is to process the acceleration instruction, the processing unit is further configured to: determine a physical accelerator corresponding to the virtual accelerator, where a network accelerator at which the physical accelerator is located is the network accelerator that is to process the acceleration instruction; and after determining, based on the virtual accelerator, the network accelerator that is to process the acceleration instruction, the processing unit is further configured to: send an identifier of the physical accelerator to the network accelerator, so that the network accelerator sends the acceleration instruction to the physical accelerator based on the identifier of the physical accelerator.

In a possible implementation, before receiving the acceleration instruction sent by the virtual machine, the transceiver unit is further configured to: receive a virtual accelerator application command sent by a management node, where the virtual accelerator application command includes the identifier of the object accelerator and an identifier of the virtual machine; and the processing unit is further configured to: if it is determined that there is no virtual accelerator corresponding to the virtual machine, create a virtual accelerator corresponding to the virtual machine, and allocate an identifier to the virtual accelerator; and store a correspondence between the identifier of the virtual accelerator and the identifier of the object accelerator.

In a possible implementation, before receiving the acceleration instruction sent by the virtual machine, the transceiver unit is further configured to: receive a virtual accelerator application command sent by a management node, where the virtual accelerator application command includes the identifier of the physical accelerator and an identifier of the virtual machine; and the processing unit is further configured to: if it is determined that there is no virtual accelerator corresponding to the virtual machine, create a virtual accelerator corresponding to the virtual machine, and allocate an identifier to the virtual accelerator; and store a correspondence between the identifier of the virtual accelerator and the identifier of the physical accelerator.

In a possible implementation, the transceiver unit is further configured to: receive a virtual accelerator application command sent by the management node, where the virtual accelerator application command includes the identifier of the object accelerator and an identifier of the virtual machine; and the processing unit is further configured to: if it is determined that there is a virtual accelerator corresponding to the virtual machine, determine whether all object accelerators corresponding to the virtual accelerator include an object accelerator indicated by the identifier of the object accelerator; and if it is determined that none of the object accelerators corresponding to the virtual accelerator include the object accelerator indicated by the identifier of the object accelerator, store a mapping relationship between the virtual accelerator and the identifier of the object accelerator.

In a possible implementation, the transceiver unit is further configured to: receive a virtual accelerator application command sent by the management node, where the virtual accelerator application command includes the identifier of the physical accelerator and an identifier of the virtual machine; and the processing unit is further configured to: if it is determined that there is a virtual accelerator corresponding to the virtual machine, determine whether all physical accelerators corresponding to the virtual accelerator include a physical accelerator indicated by the identifier of the physical accelerator; and if it is determined that none of the physical accelerators corresponding to the virtual accelerator include the physical accelerator indicated by the identifier of the physical accelerator, store a mapping relationship between the virtual accelerator and the identifier of the physical accelerator.

In a possible implementation, the transceiver unit is further configured to: receive an object accelerator deletion command sent by the management node, where the object accelerator deletion command includes the identifier of the virtual machine and the identifier of the object accelerator; and the processing unit is further configured to: if it is determined that there is a virtual accelerator corresponding to the virtual machine, determine, based on the identifier of the object accelerator, whether all object accelerators corresponding to the virtual accelerator include an object accelerator indicated by the identifier of the object accelerator; and if it is determined that all the object accelerators corresponding to the virtual accelerator include the object accelerator indicated by the identifier of the object accelerator, delete the identifier of the object accelerator.

In a possible implementation, the transceiver unit is further configured to: receive a physical accelerator deletion command sent by the management node, where the physical accelerator deletion command includes the identifier of the virtual machine and the identifier of the physical accelerator; and the processing unit is further configured to: if it is determined that there is a virtual accelerator corresponding to the virtual machine, determine, based on the identifier of the physical accelerator, whether all physical accelerators corresponding to the virtual accelerator include a physical accelerator indicated by the identifier of the physical accelerator; and if it is determined that all the physical accelerators corresponding to the virtual accelerator include the physical accelerator indicated by the identifier of the physical accelerator, delete the identifier of the physical accelerator.

In a possible implementation, the acceleration instruction further includes the identifier of the virtual machine; the processing unit is further configured to pre-store a correspondence between the identifier of the virtual machine and the identifier of the virtual accelerator; and when determining the virtual accelerator allocated to the virtual machine, the processing unit is further configured to: determine, based on the correspondence between the identifier of the virtual machine and the identifier of the virtual accelerator, the virtual accelerator corresponding to the virtual machine.

In a possible implementation, the acceleration instruction further includes the identifier of the virtual accelerator, and the virtual machine pre-stores a correspondence between the identifier of the virtual machine and the identifier of the virtual accelerator; and when determining the virtual accelerator allocated to the virtual machine, the processing unit is further configured to: determine, based on the identifier of the virtual accelerator, the virtual accelerator corresponding to the virtual machine.

According to a fifth aspect, an embodiment provides a scheduling apparatus, applied to an acceleration system, where the acceleration system includes a computing node and at least one network accelerator, the computing node includes a virtual machine and the scheduling apparatus, and the network accelerator includes at least one physical accelerator; and the scheduling apparatus includes: a processor, a memory, and a bus, where the processor and the memory are connected by using the bus, the memory is configured to store a set of application code, and the processor is configured to invoke the application code stored in the memory, to perform the step in the first aspect or any implementation of the first aspect in the embodiments.

According to a sixth aspect, an embodiment provides a management node, applied to an acceleration system, where the acceleration system includes the management node, a computing node, and at least one network accelerator, the computing node includes a virtual machine and a scheduling apparatus, and the network accelerator includes at least one physical accelerator; and the management node includes: a transceiver unit configured to receive an acceleration resource application request sent by the virtual machine, where the acceleration resource application request includes an identifier of the virtual machine, a quantity of required physical acceleration resources allocated to the virtual machine, and a type identifier of a physical accelerator that provides the physical acceleration resource for the virtual machine; and a processing unit configured to: determine, based on the type identifier of the physical accelerator and the quantity of the required physical acceleration resources, each network accelerator to which the at least one physical accelerator that provides the physical acceleration resource belongs; and generate a physical acceleration resource creation command, where the physical acceleration resource creation command is used to instruct the network accelerator to create an object accelerator, and store a correspondence between an identifier of the object accelerator and an identifier of a physical accelerator that is in the network accelerator and that is configured to provide a physical acceleration resource for the virtual machine, where the transceiver unit is further configured to: send the physical acceleration resource creation command to the network accelerator; and receive the identifier of the object accelerator that is sent by the network accelerator; and the processing unit is further configured to: generate a virtual accelerator application command, where the virtual accelerator application command includes the identifier of the virtual machine and the identifier of the object accelerator; and send the virtual accelerator application command to the scheduling apparatus, so that the scheduling apparatus stores a correspondence between an identifier of a virtual accelerator and the identifier of the object accelerator.

It may be understood that, after receiving the virtual accelerator application command, the scheduling apparatus may store the correspondence between the identifier of the virtual accelerator and the identifier of the object accelerator based on the virtual accelerator application command.

According to a seventh aspect, an embodiment provides a management node, applied to an acceleration system, where the acceleration system includes the management node, a computing node, and at least one network accelerator, the computing node includes a virtual machine and a scheduling apparatus, and the network accelerator includes at least one physical accelerator; and the management node includes: a processor, a memory, and a bus, where the processor and the memory are connected by using the bus, the memory is configured to store a set of application code, and the processor is configured to invoke the application code stored in the memory, to perform the step in the sixth aspect in the embodiments.

According to an eighth aspect, an embodiment provides a management node, applied to an acceleration system, where the acceleration system includes the management node, a computing node, and at least one network accelerator, the computing node includes a virtual machine and a scheduling apparatus, and the network accelerator includes at least one physical accelerator; and the management node includes: a transceiver unit configured to receive an acceleration resource application request sent by the virtual machine, where the acceleration resource application request includes an identifier of the virtual machine, a quantity of required physical acceleration resources allocated to the virtual machine, and a type identifier of a physical accelerator that provides the physical acceleration resource for the virtual machine; and a processing unit configured to: determine, based on the type identifier of the physical accelerator and the quantity of the required physical acceleration resources, each network accelerator to which the at least one physical accelerator that provides the physical acceleration resource belongs; generate a virtual accelerator application command, where the virtual accelerator application command includes the identifier of the virtual machine and an identifier of a physical accelerator that is in each network accelerator and that is configured to provide a physical acceleration resource for the virtual machine; and send the virtual accelerator application command to the scheduling apparatus, so that the scheduling apparatus stores, based on the virtual accelerator application command, a correspondence between an identifier of a virtual accelerator and the identifier of the physical accelerator that is in each network accelerator and that is configured to provide the physical acceleration resource for the virtual machine.

According to a ninth aspect, an embodiment provides a management node, applied to an acceleration system, where the acceleration system includes the management node, a computing node, and at least one network accelerator, the computing node includes a virtual machine and a scheduling apparatus, and the network accelerator includes at least one physical accelerator; and the management node includes: a processor, a memory, and a bus, where the processor and the memory are connected by using the bus, the memory is configured to store a set of application code, and the processor is configured to invoke the application code stored in the memory, to perform the step in the eighth aspect in the embodiments.

According to a tenth aspect, an embodiment provides an acceleration system, where the acceleration system may include the management node in any implementation of the sixth aspect or the eighth aspect, and further include a computing node and at least one network accelerator, where the computing node includes a virtual machine and the scheduling apparatus in the fourth aspect or any implementation of the fourth aspect, and the network accelerator includes at least one physical accelerator.

According to an eleventh aspect, an embodiment provides a computer readable storage medium, where the computer readable storage medium stores an instruction, and when running on a computer, the instruction implements the method in the first aspect or any possible implementation of the first aspect.

According to a twelfth aspect, an embodiment provides a computer readable storage medium, where the computer readable storage medium stores an instruction, and when running on a computer, the instruction implements the method in the second aspect.

According to a thirteenth aspect, an embodiment provides a computer readable storage medium, where the computer readable storage medium stores an instruction, and when running on a computer, the instruction implements the method in the third aspect.

BRIEF DESCRIPTION OF DRAWINGS

To describe the technical solutions in the embodiments or in the background more clearly, the following describes the accompanying drawings for describing the embodiments.

DESCRIPTION OF EMBODIMENTS

The following describes the embodiments with reference to the accompanying drawings. The terms "including", "having", and any other variant thereof mentioned in this specification, claims, and the accompanying drawings are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
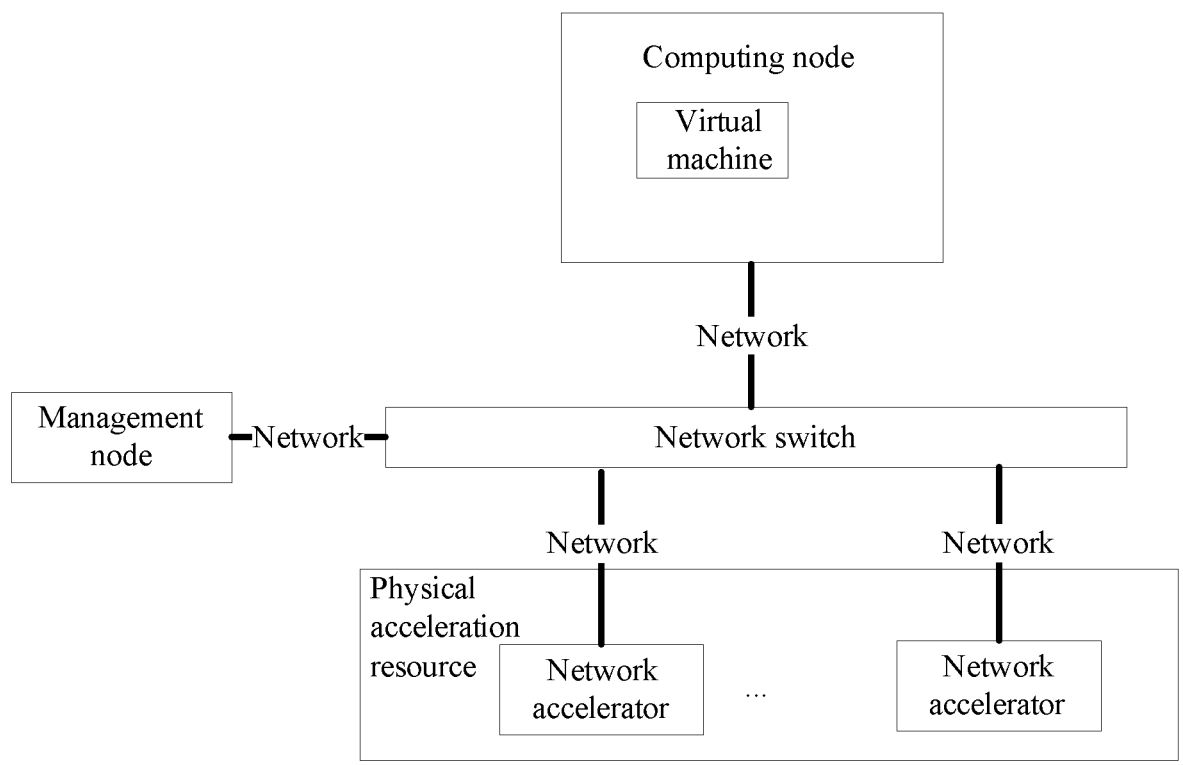
FIG. 1 is a schematic architectural diagram of an acceleration resource scheduling system according to an embodiment.

Referring to FIG. 1, FIG. 1 is a schematic architectural diagram of an acceleration resource scheduling system according to an embodiment. As shown in FIG. 1, the acceleration resource scheduling system includes a computing node, a management node, and a physical acceleration resource. The computing node may be connected to the physical acceleration resource by using a network switch, the management node is connected to the computing node by using the network switch, and the management node is further connected to the physical acceleration resource by using the network switch. The management node and the physical acceleration resource may be deployed in a cloud, and the management node may be a server configured to perform centralized management on physical acceleration resources in the cloud. The physical acceleration resource includes at least one network accelerator. The computing node may create one or more virtual machines. If the virtual machine created by the computing node needs to schedule the physical acceleration resource in the cloud to perform acceleration processing on to-be-accelerated data, the virtual machine may initiate an application for the acceleration resource to the management node in advance. After virtualizing the physical acceleration resource, the management node configures, for the virtual machine for use, at least some physical acceleration resources deployed in the cloud, and then the virtual machine may schedule the at least some configured physical acceleration resources in the cloud for acceleration processing.

The computing node may be a computing device such as a server, a computer, or a communications terminal.

Figure 2:
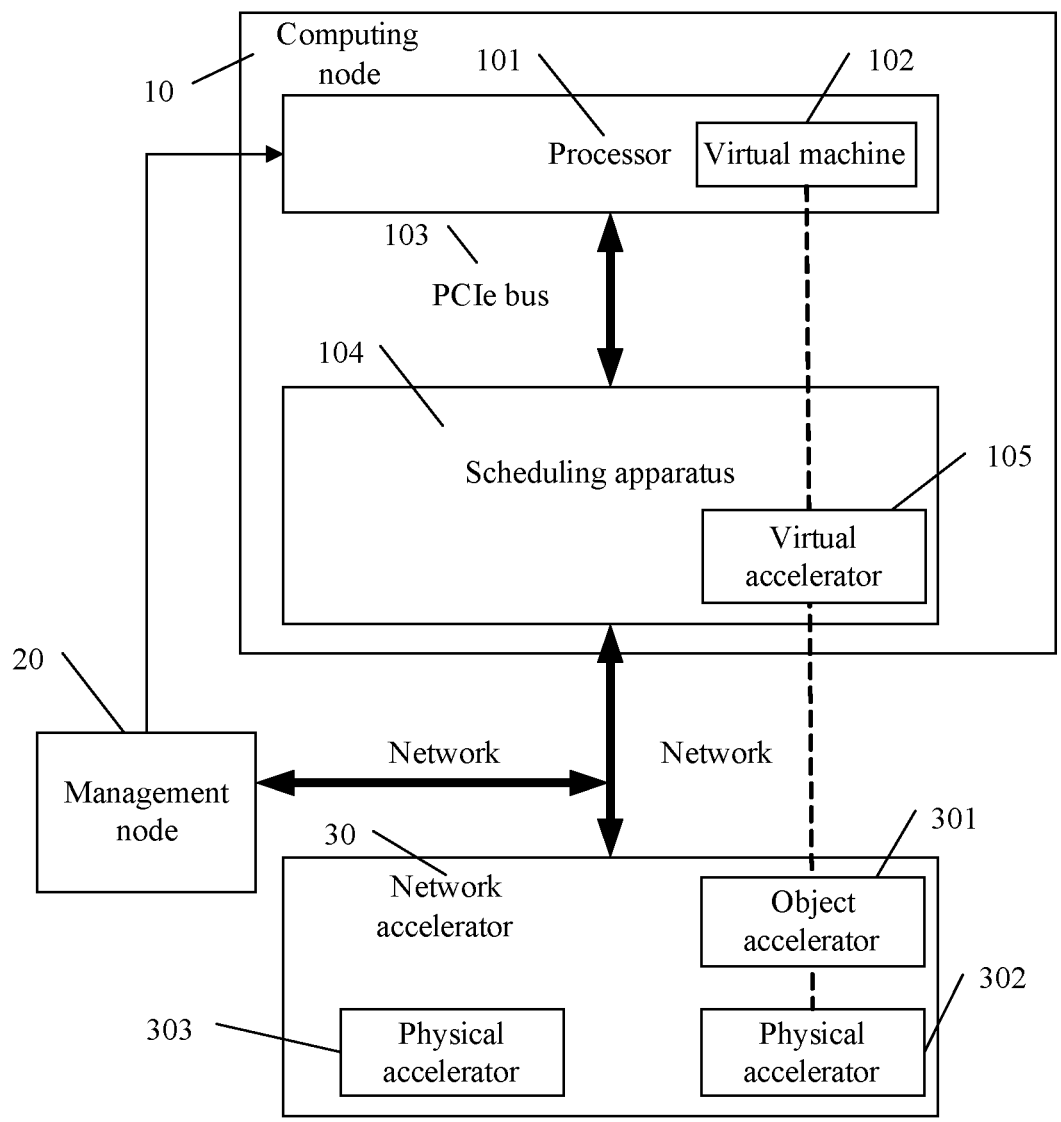
FIG. 2 is a schematic architectural diagram of another acceleration resource scheduling system according to an embodiment.

Referring to FIG. 2, FIG. 2 is a schematic architectural diagram of another acceleration resource scheduling system according to an embodiment. Based on the system architecture shown in FIG. 1, the system architecture shown in FIG. 2 is described by using an example in which physical acceleration resources include one network accelerator 30 and a computing node 10 includes one virtual machine 102. As shown in FIG. 2, the computing node 10 includes the virtual machine 102 and a scheduling apparatus 104. The network accelerator 30 includes at least one physical accelerator, and in FIG. 2, two physical accelerators 302 and 303 are used as an example for description. The physical accelerator in the network accelerator 30 may be implemented by using, but not limited to, an apparatus such as a GPU, a field-programmable gate array (FPGA), or an application-specific integrated circuit (ASIC) chip. At least one physical accelerator in each network accelerator 30 may be implemented by using, but not limited to, an apparatus such as a GPU, an FPGA, or an ASIC.

Specifically, a processor 101 used by the virtual machine 102 in the computing node 10 is connected to the scheduling apparatus 104 by using a Peripheral Component Interconnect Express (PCIe) bus 103.

The management node 20 is separately connected to the network accelerator 30, the virtual machine 102, and the scheduling apparatus 104 by using a network, and the management node 20 is configured to allocate, based on an acceleration requirement of a user, at least some physical acceleration resources in the physical acceleration resources to the virtual machine 102 for use. In a specific implementation, the management node 20 sends a virtual accelerator application command to the scheduling apparatus 104, so as to instruct the scheduling apparatus 104 to be responsible for creating a virtual accelerator 105 and processing mapping logic between the virtual accelerator 105 and an object accelerator 301 or mapping logic between the virtual accelerator 105 and the physical accelerator 302. A mapping logic relationship between the virtual accelerator 105 and the object accelerator 301 is indicated by a dashed line shown in FIG. 2. The virtual accelerator 105 is mapping, on the scheduling apparatus 104, of a physical acceleration resource allocated to the virtual machine 102, the physical acceleration resource includes at least some physical acceleration resources in the at least one physical accelerator 302 in the at least one network accelerator 30, and a physical acceleration resource provided in the cloud is allocated to the virtual machine 102.

The network accelerator 30, which is connected to the scheduling apparatus 104 and the management node 20 by using a network, is configured to: create the object accelerator 301 based on a physical acceleration resource creation command sent by the management node 20, create an identifier of the object accelerator 301, and store a correspondence between the identifier of the object accelerator 301 and an identifier of a physical accelerator that is in the network accelerator 30 and that is configured to provide a physical acceleration resource for the virtual machine 102. The correspondence between the identifier of the object accelerator 301 and the identifier of the physical accelerator that is in the network accelerator 30 and that is configured to provide the physical acceleration resource for the virtual machine 102 is indicated by a dashed line in FIG. 2.

The scheduling apparatus 104 is configured to be responsible for: creating the virtual accelerator 105 based on a virtual accelerator application command sent by the management node 20 and processing the mapping logic between the virtual accelerator 105 and the object accelerator 301; and deleting the mapping logic between the virtual accelerator 105 and the object accelerator 301 based on an object accelerator deletion command sent by the management node 20.

The management node 20 is further configured to delete, based on a resource deletion requirement of the user from the at least some physical acceleration resources that are in the physical acceleration resources and that have been allocated to the virtual machine 102 for use, some or all physical acceleration resources that need to be deleted by the user. Optionally, in an implementation, the management node 20 receives an acceleration resource deletion request sent by a client, and deletes the physical acceleration resource that is of the virtual machine 102 and that needs to be deleted by the user. The client may be application management software deployed on the virtual machine 102 or any network communications device. After logging in to the client, the user may select the to-be-deleted physical acceleration resource based on physical acceleration resource information that corresponds to the virtual machine 102 and that is presented in an interface of the client, where the physical acceleration resource information includes an identifier of the virtual accelerator 105 or the identifier of the object accelerator 301 that has been allocated to the virtual machine 102.

Figure 3:
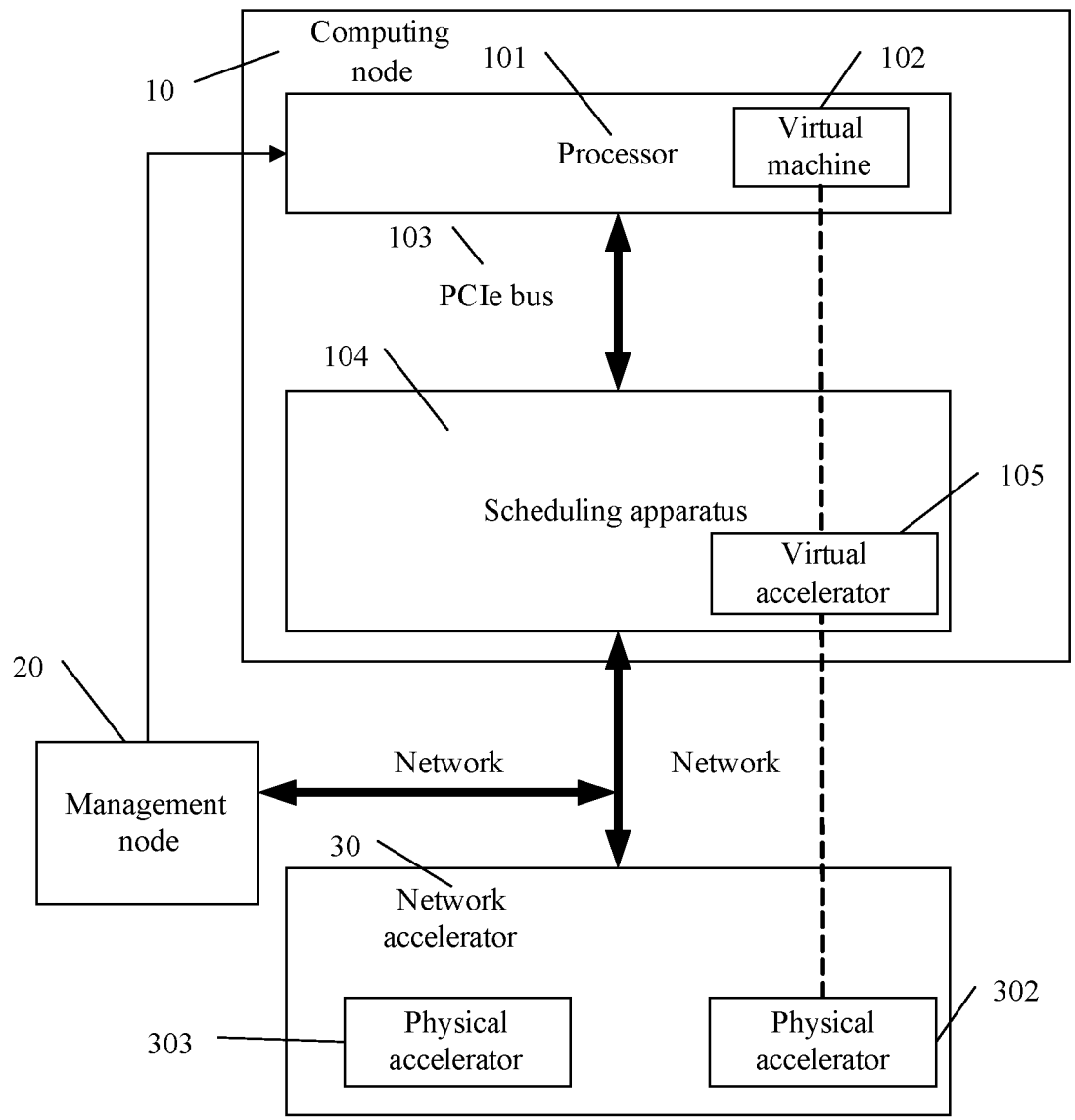
FIG. 3 is a schematic architectural diagram of another acceleration resource scheduling system according to an embodiment.

Referring to FIG. 3, FIG. 3 is a schematic architectural diagram of another acceleration resource scheduling system according to an embodiment. The system architecture shown in FIG. 3 and the system architecture shown in FIG. 2 have no difference in hardware implementation, except that mapping logic between a virtual accelerator and a physical acceleration resource is different. Mapping logic shown in FIG. 2 between a virtual accelerator and a physical acceleration resource is implemented by using mapping logic between the virtual accelerator and an object accelerator and mapping logic between the object accelerator and a physical accelerator. Mapping logic shown in FIG. 3 between a virtual accelerator and a physical acceleration resource is implemented by using mapping logic between the virtual accelerator and a physical accelerator. In the system architecture shown in FIG. 3, a management node 20 is connected to a network accelerator 30, a virtual machine 102, and a scheduling apparatus 104 by using a network, and the management node 20 is configured to allocate, based on an acceleration requirement of a user, at least some physical acceleration resources in physical acceleration resources to the virtual machine 102 for use. In a specific implementation, the management node 20 sends a virtual accelerator application command to the scheduling apparatus 104, so as to instruct the scheduling apparatus 104 to be responsible for creating a virtual accelerator 105 and processing mapping logic between the virtual accelerator 105 and a physical accelerator 302. The mapping logic between the virtual accelerator 105 and the physical accelerator 302 is indicated by using a dashed line in FIG. 3.

In addition, the system architecture shown in FIG. 3 is different from the system architecture shown in FIG. 2 in that, the scheduling apparatus 104 is configured to be responsible for: creating the virtual accelerator 105 based on a virtual accelerator application command sent by the management node 20 and processing the mapping logic between the virtual accelerator 105 and the physical accelerator 302; and deleting the mapping logic between the virtual accelerator 105 and the physical accelerator 302 based on a physical accelerator deletion command sent by the management node 20.

In addition, the system architecture shown in FIG. 3 is different from the system architecture shown in FIG. 2 in that, the management node 20 is further configured to delete, based on a resource deletion requirement of the user from at least some physical acceleration resources that are in the physical acceleration resources and that have been allocated to the virtual machine 102 for use, some or all physical acceleration resources that need to be deleted by the user. Optionally, in an implementation, the management node 20 receives a physical accelerator deletion command sent by a client, and deletes the physical acceleration resource that is of the virtual machine 102 and that needs to be deleted by the user. The physical accelerator deletion command includes an identifier of the to-be-deleted physical accelerator 302 and an identifier of the virtual machine 102. The client may be application management software deployed on the virtual machine 102 or any network communications device. After logging in to the client, the user may select the to-be-deleted physical acceleration resource based on physical acceleration resource information that corresponds to the virtual machine 102 and that is presented in an interface of the client, where the physical acceleration resource information includes the identifier of the virtual accelerator 105 or the identifier of the physical accelerator 302 that has been allocated to the virtual machine 102. In the embodiment of the foregoing system architecture, after the physical acceleration resource provided by the at least one network accelerator in the cloud is virtualized, the virtual machine corresponds to a virtual accelerator, so as to present, to the virtual machine, an acceleration resource provided for the virtual accelerator. The VM directly accesses a corresponding virtual accelerator to implement access of the virtual machine to the physical acceleration resource in the cloud, thereby implementing heterogeneous computing of the virtual machine in a scenario of heterogeneous acceleration resource virtualization.

Figure 4:
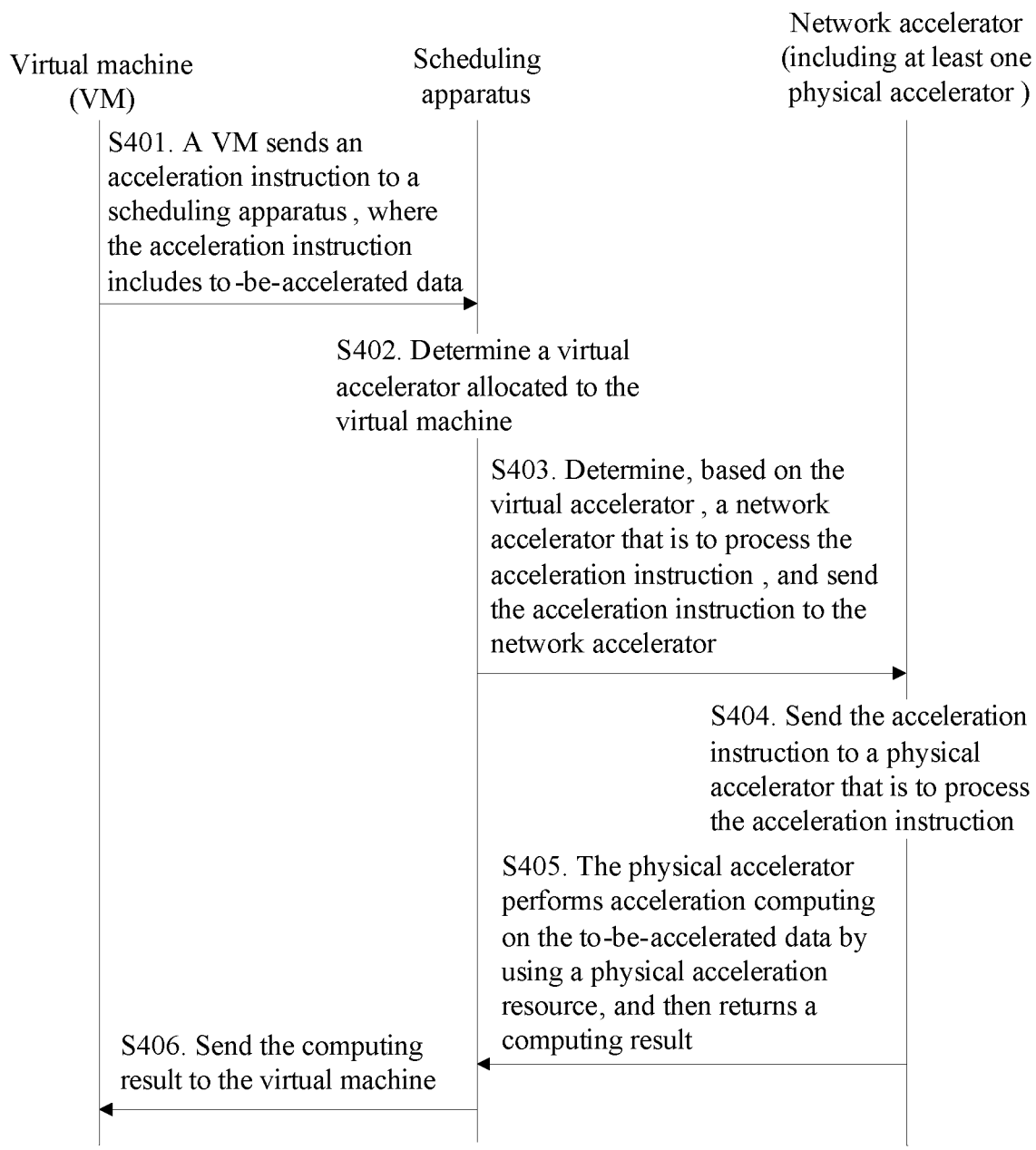
FIG. 4 is a schematic flowchart of an acceleration resource scheduling method according to an embodiment.

With reference to the acceleration resource scheduling system architectures shown in FIG. 2 and FIG. 3, the following describes an acceleration resource scheduling method in an embodiment in detail. An implementation of an acceleration requirement of a virtual machine through the system architecture shown in FIG. 2 or FIG. 3 is: processing the acceleration requirement of the virtual machine by using a scheduling apparatus in a computing node. In a specific implementation, referring to FIG. 4, FIG. 4 is a schematic flowchart of an acceleration resource scheduling method according to an embodiment. The method is applied to an acceleration system, where the acceleration system includes a computing node and at least one network accelerator, the computing node includes a virtual machine and a scheduling apparatus, and the network accelerator includes at least one physical accelerator. Step S401 in the method in FIG. 4 may be performed by the virtual machine in FIG. 1, FIG. 2, or FIG. 3; and steps S402, S403, and S406 in the method in FIG. 4 may be performed by the scheduling apparatus in FIG. 1, FIG. 2, or FIG. 3, or a scheduling apparatus in FIG. 7 or FIG. 8, or a processing unit in a scheduling apparatus shown in FIG. 7, or a processor 110 in a scheduling apparatus shown in FIG. 8. The method includes the following steps.

S401. A VM sends an acceleration instruction to a scheduling apparatus, where the acceleration instruction includes to-be-accelerated data.

The acceleration instruction further includes an identifier of the virtual machine or an identifier of a virtual accelerator.

The identifier of the virtual machine is used to indicate a virtual machine that sends the acceleration instruction.

The identifier of the virtual accelerator is used to indicate a virtual accelerator that is to process the acceleration instruction. Based on the system architecture shown in FIG. 2 or FIG. 3, one corresponding virtual accelerator is allocated to each virtual machine in each computing node. Each virtual machine pre-stores an identifier of a virtual accelerator corresponding to the virtual machine.

S402. The scheduling apparatus determines a virtual accelerator allocated to the virtual machine.

Optionally, if the acceleration instruction in step S401 further includes the identifier of the virtual machine, the scheduling apparatus pre-stores a correspondence between the identifier of the virtual machine and the identifier of the virtual accelerator, and the determining a virtual accelerator allocated to the virtual machine includes: determining, based on the correspondence between the identifier of the virtual machine and the identifier of the virtual accelerator, the virtual accelerator corresponding to the virtual machine.

Optionally, if the acceleration instruction in step S401 further includes the identifier of the virtual machine, the determining a virtual accelerator allocated to the virtual machine includes: determining, based on the identifier of the virtual accelerator, the virtual accelerator corresponding to the virtual machine.

The virtual accelerator is mapping, on the scheduling apparatus, of a physical acceleration resource allocated to the virtual machine, and the physical acceleration resource includes at least some physical acceleration resources in the at least one physical accelerator in the at least one network accelerator.

S403. The scheduling apparatus determines, based on the virtual accelerator, a network accelerator that is to process the acceleration instruction, and sends the acceleration instruction to the network accelerator.

S404. The network accelerator sends the acceleration instruction to a physical accelerator that is to process the acceleration instruction.

S405. The physical accelerator performs acceleration computing on the to-be-accelerated data by using a physical acceleration resource, and then returns a computing result to the scheduling apparatus.

S406. The scheduling apparatus sends the computing result to the virtual machine.

An entire scheduling process in which the VM accesses the physical acceleration resource in the network accelerator does not require participation of a virtualization middle layer (hypervisor) in the computing node, and can be implemented by the scheduling apparatus by directly accessing the virtual accelerator corresponding to the virtual machine, thereby reducing a delay of the virtual machine in accessing the network accelerator. In addition, a virtual accelerator is visible to the VM, and the VM does not need to directly manage a plurality of network accelerators, thereby simplifying use and management of an acceleration resource by a VM tenant. In addition, a mapping relationship between the virtual accelerator and the physical acceleration resource is implemented by implementing the mapping, on the scheduling apparatus, of the physical acceleration resource allocated to the virtual machine. In this way, physical acceleration resources to which virtual accelerators respectively corresponding to different virtual machines are mapped can be determined rapidly, and direct forwarding of the acceleration instruction of the virtual machine can be implemented, thereby completing acceleration of an entire data flow of the virtual machine. In addition, different types of physical acceleration resources in a cloud, such as GPU, FPGA, or ASIC acceleration resources, can be managed and virtualized in a centralized manner. The physical acceleration resources in the cloud are flexibly virtualized based on different acceleration requirements of different virtual machines, and therefore compatibility is strong.

To implement mapping between a virtual accelerator and at least some physical acceleration resources in physical acceleration resources in a cloud, the virtual accelerator may be mapped to an object accelerator, and a network accelerator at which the object accelerator is located is a network accelerator that is allocated to the virtual machine to process to-be-accelerated data. Specifically, the mapping may be implemented based on the system architecture shown in FIG. 2 and with reference to a method exemplified in FIG. 5A and FIG. 5B. Alternatively, the virtual accelerator may be directly mapped to a physical accelerator in the at least some physical acceleration resources in a cloud, and a network accelerator at which the physical accelerator is located is a network accelerator that is allocated to the virtual machine to process to-be-accelerated data. Specifically, the mapping may be implemented based on the system architecture shown in FIG. 3 and with reference to a method exemplified in FIG. 6A and FIG. 6B.

Figure 5A:
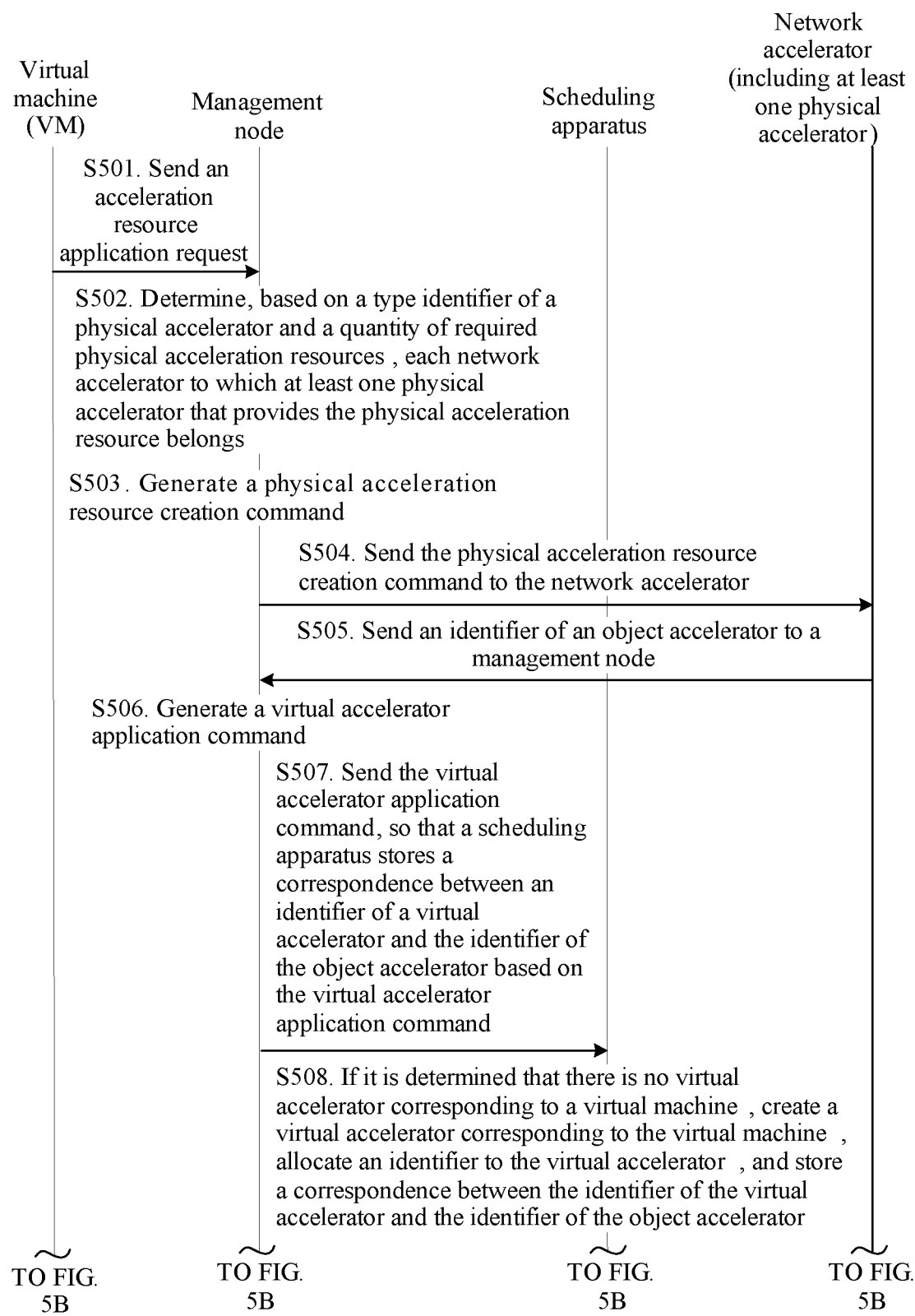
FIG. 5A and FIG. 5B are a schematic flowchart of another acceleration resource scheduling method according to an embodiment.
Figure 5B:
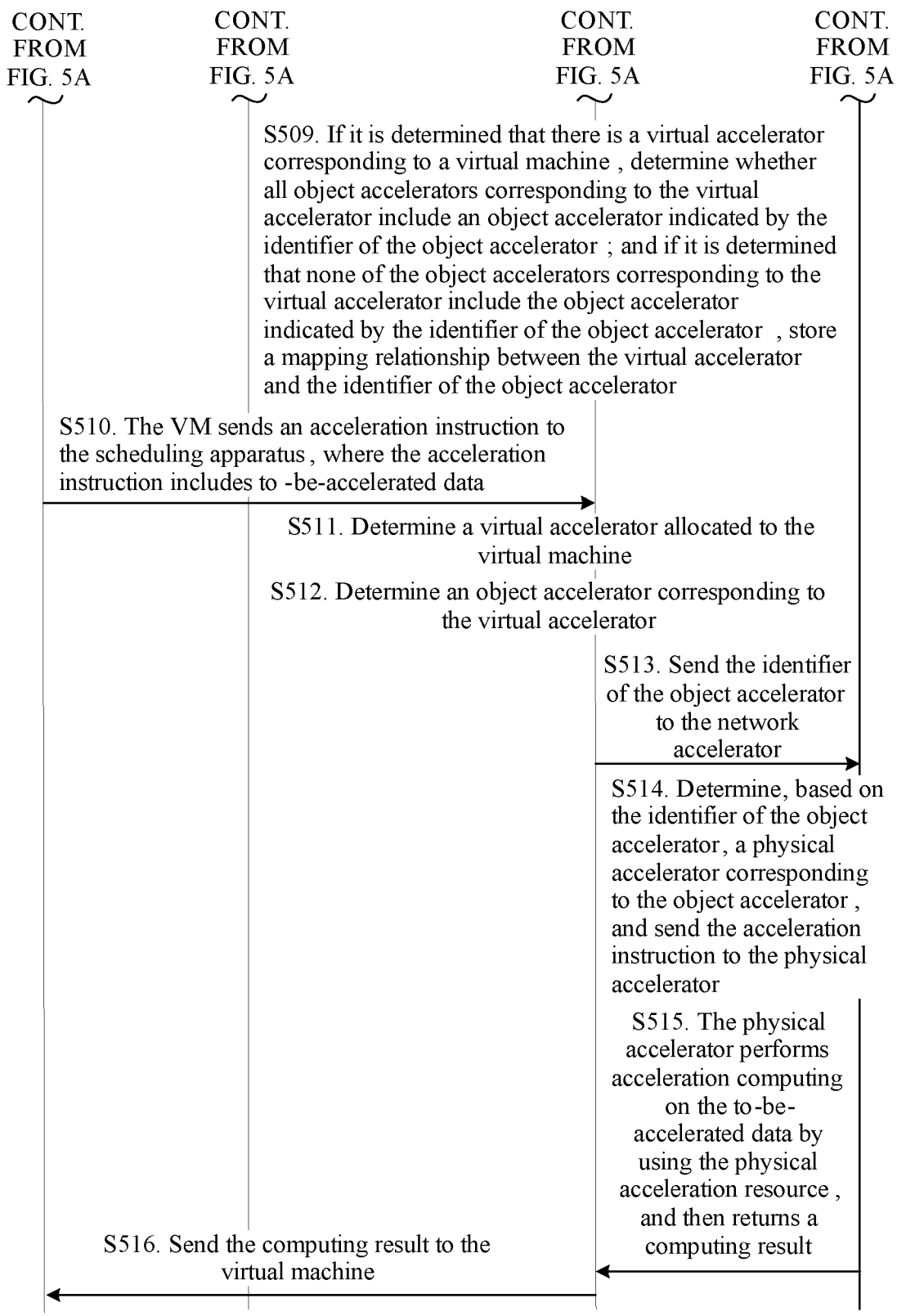

Referring to FIG. 5A and FIG. 5B, FIG. 5A and FIG. 5B are a schematic flowchart of another acceleration resource scheduling method according to an embodiment. When a VM intends to apply for an acceleration resource, the VM may initiate an acceleration resource application request to a management node by using a client; and the management node may generate a virtual accelerator application command based on an acceleration resource requirement of the VM and resource usage of a network accelerator, and send the command to a scheduling apparatus, so as to instruct the scheduling apparatus to perform acceleration resource scheduling. Steps S501 and S510 in the method in FIG. 5A and FIG. 5B may be performed by the virtual machine in FIG. 1, FIG. 2, or FIG. 3; steps S502, S503, S504, S506, and S507 in the method in FIG. 5A and FIG. 5B may be performed by the management node in FIG. 1, FIG. 2, or FIG. 3, or a management node in FIG. 9 or FIG. 10, or a processing unit in a management node shown in FIG. 9, or a processor 210 in a management node shown in FIG. 10; and steps S508, S509, S511, S512, S513, and S516 in the method in FIG. 5A and FIG. 5B may be performed by the scheduling apparatus in FIG. 1, FIG. 2, or FIG. 3, or a scheduling apparatus in FIG. 7 or FIG. 8, or a processing unit in a scheduling apparatus shown in FIG. 7, or a processor 110 in a scheduling apparatus shown in FIG. 8. The method may include the following steps.

S501. A virtual machine sends an acceleration resource application request to a management node.

The acceleration resource application request includes an identifier of the virtual machine, a quantity of required physical acceleration resources allocated to the virtual machine, and a type identifier of a physical accelerator that provides the physical acceleration resource for the virtual machine.

S502. The management node determines, based on the type identifier of the physical accelerator and the quantity of the required physical acceleration resources, each network accelerator to which the at least one physical accelerator that provides the physical acceleration resource belongs.

S503. The management node generates a physical acceleration resource creation command, where the physical acceleration resource creation command is used to instruct the network accelerator to create an object accelerator, and store a correspondence between an identifier of the object accelerator and an identifier of a physical accelerator that is in the network accelerator and that is configured to provide a physical acceleration resource for the virtual machine.

S504. The management node sends the physical acceleration resource creation command to the network accelerator.

S505. The network accelerator sends the identifier of the object accelerator to the management node.

The network accelerator receives the physical acceleration resource creation command, creates the identifier of the object accelerator, and stores the correspondence between the identifier of the object accelerator and an identifier of each physical accelerator that is in the network accelerator and that is configured to provide a physical acceleration resource for the virtual machine.

S506. The management node generates a virtual accelerator application command, where the virtual accelerator application command includes an identifier of the virtual machine and the identifier of the object accelerator.

S507. The management node sends the virtual accelerator application command to the scheduling apparatus, so that the scheduling apparatus stores a correspondence between an identifier of a virtual accelerator and the identifier of the object accelerator based on the virtual accelerator application command.

The acceleration resource is allocated to the virtual accelerator of the virtual machine by using steps S501 to S507. When a user needs to delete the acceleration resource subsequently, a specific implementation is: receiving, by the management node, an acceleration resource deletion request sent by the client, and deleting a physical acceleration resource that is of the virtual machine and that needs to be deleted by the user. The client may be application management software deployed on the virtual machine or any network communications device. After logging in to the client, the user may select the to-be-deleted physical acceleration resource based on physical acceleration resource information that corresponds to the virtual machine and that is presented in an interface of the client, where the physical acceleration resource information includes the identifier of the virtual accelerator, the identifier of the physical accelerator, or the identifier of the object accelerator that has been allocated to the virtual machine.

If the user needs to delete physical acceleration resources that are provided by some physical accelerators corresponding to an object accelerator corresponding to the virtual accelerator, the client sends the acceleration resource deletion request to the management node. The acceleration resource deletion request includes an identifier of a to-be-deleted physical accelerator and an identifier of an object accelerator corresponding to the to-be-deleted physical accelerator. After receiving the acceleration resource deletion request sent by the client, the management node generates a physical acceleration resource deletion command, and sends the physical acceleration resource deletion command to a network accelerator at which the to-be-deleted physical accelerator is located. The physical acceleration resource deletion command is used to instruct the network accelerator at which the to-be-deleted physical accelerator is located to delete a correspondence between the identifier of the to-be-deleted physical accelerator and the identifier of the object accelerator corresponding to the to-be-deleted physical accelerator.

If the user needs to delete physical acceleration resources that are provided by all physical accelerators corresponding to the object accelerator corresponding to the virtual accelerator, the acceleration resource deletion request sent by the user by using the client further includes the identifier of the virtual machine. In a specific implementation, after the receiving, by the management node, an acceleration resource deletion request sent by the client, the following is further included: sending, by the management node, an object accelerator deletion command to the scheduling apparatus, where the object accelerator deletion command includes the identifier of the virtual machine and the identifier of the object accelerator, and the object accelerator deletion command is used to instruct the scheduling apparatus to: after it is determined, based on the identifier of the virtual machine, that there is a virtual accelerator corresponding to the virtual machine, if it is determined that all object accelerators corresponding to the virtual accelerator include an object accelerator indicated by the identifier of the object accelerator, delete the identifier of the object accelerator.

If the user needs to delete all physical acceleration resources provided by the virtual accelerator, the acceleration resource deletion request sent by the user by using the client further includes the identifier of the virtual machine and the identifier of the virtual accelerator. In a specific implementation, after the receiving, by the management node, an acceleration resource deletion request sent by the client, the following is further included: sending, by the management node, a virtual accelerator deletion command to the scheduling apparatus, where the virtual accelerator deletion command includes the identifier of the virtual machine and the identifier of the virtual accelerator, and the virtual accelerator deletion command is used to instruct the scheduling apparatus to: after it is determined, based on the identifier of the virtual machine, that there is a virtual accelerator indicated by the identifier of the virtual accelerator corresponding to the virtual machine, delete correspondences between the identifier of the virtual accelerator and identifiers of all object accelerators.

The following describes a process in which the scheduling apparatus creates a virtual accelerator after receiving the virtual accelerator application command and determining, based on the identifier of the virtual machine, that there is no virtual accelerator corresponding to the virtual machine. For specific implementation, refer to step S508.

S508. If it is determined that there is no virtual accelerator corresponding to the virtual machine, the scheduling apparatus creates a virtual accelerator corresponding to the virtual machine, allocates an identifier to the virtual accelerator, and stores a correspondence between the identifier of the virtual accelerator and the identifier of the object accelerator.

The following describes a process in which the scheduling apparatus updates a virtual accelerator after receiving the virtual accelerator application command and determining, based on the identifier of the virtual machine, that there is a virtual accelerator corresponding to the virtual machine. For specific implementation, refer to step S509.

S509. If it is determined that there is a virtual accelerator corresponding to the virtual machine, determine whether all object accelerators corresponding to the virtual accelerator include an object accelerator indicated by the identifier of the object accelerator; and if it is determined that none of the object accelerators corresponding to the virtual accelerator include the object accelerator indicated by the identifier of the object accelerator, store a mapping relationship between the virtual accelerator and the identifier of the object accelerator.

The following describes how the scheduling apparatus provides the physical acceleration resource to perform acceleration processing on to-be-accelerated data after creating the virtual accelerator. Specifically, the following steps S510 to S516 are included.

S510. The VM sends an acceleration instruction to the scheduling apparatus, where the acceleration instruction includes to-be-accelerated data. For specific implementation, refer to step S401 shown in FIG. 4.

S511. The scheduling apparatus determines a virtual accelerator allocated to the virtual machine. For specific implementation details, refer to step S402 shown in FIG. 4.

Optionally, the acceleration instruction further includes the identifier of the virtual machine; and the scheduling apparatus pre-stores a correspondence between the identifier of the virtual machine and the identifier of the virtual accelerator, and may determine, based on the correspondence between the identifier of the virtual machine and the identifier of the virtual accelerator, the virtual accelerator corresponding to the virtual machine.

Alternatively, the acceleration instruction further includes the identifier of the virtual accelerator, and the virtual machine pre-stores a correspondence between the identifier of the virtual machine and the identifier of the virtual accelerator; and the scheduling apparatus may determine, based on the identifier of the virtual accelerator, the virtual accelerator corresponding to the virtual machine.

S512. The scheduling apparatus determines an object accelerator corresponding to the virtual accelerator.

A network accelerator at which the object accelerator is located is the network accelerator that is to process the acceleration instruction.

S513. The scheduling apparatus sends the identifier of the object accelerator to the network accelerator.

S514. The network accelerator determines, based on the identifier of the object accelerator, a physical accelerator corresponding to the object accelerator, and sends the acceleration instruction to the physical accelerator.

S515. The physical accelerator performs acceleration computing on the to-be-accelerated data by using the physical acceleration resource, and then returns a computing result to the scheduling apparatus.

S516. The scheduling apparatus sends the computing result to the virtual machine.

Certainly, to implement mapping between the virtual accelerator and at least some physical acceleration resources in physical acceleration resources in a cloud, in another optional implementation, the virtual accelerator may be directly mapped to a physical accelerator in the at least some physical acceleration resources in the cloud, and a network accelerator at which the physical accelerator is located is a network accelerator that is allocated to the virtual machine to process to-be-accelerated data. Specifically, the mapping may be implemented based on the system architecture shown in FIG. 3 and with reference to a method exemplified in FIG. 6A and FIG. 6B.

Figure 6A:
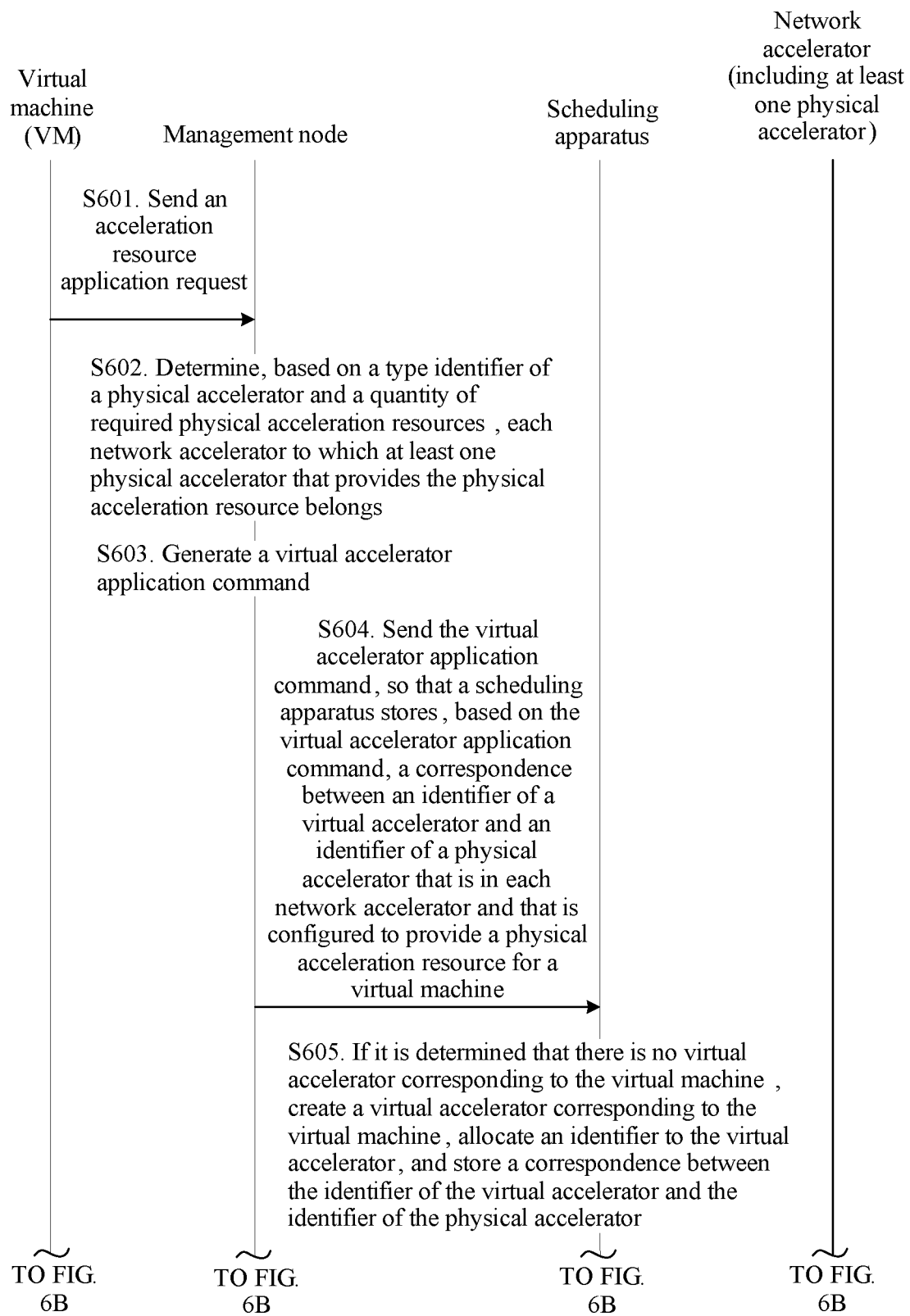
FIG. 6A and FIG. 6B are a schematic flowchart of still another acceleration resource scheduling method according to an embodiment.
Figure 6B:
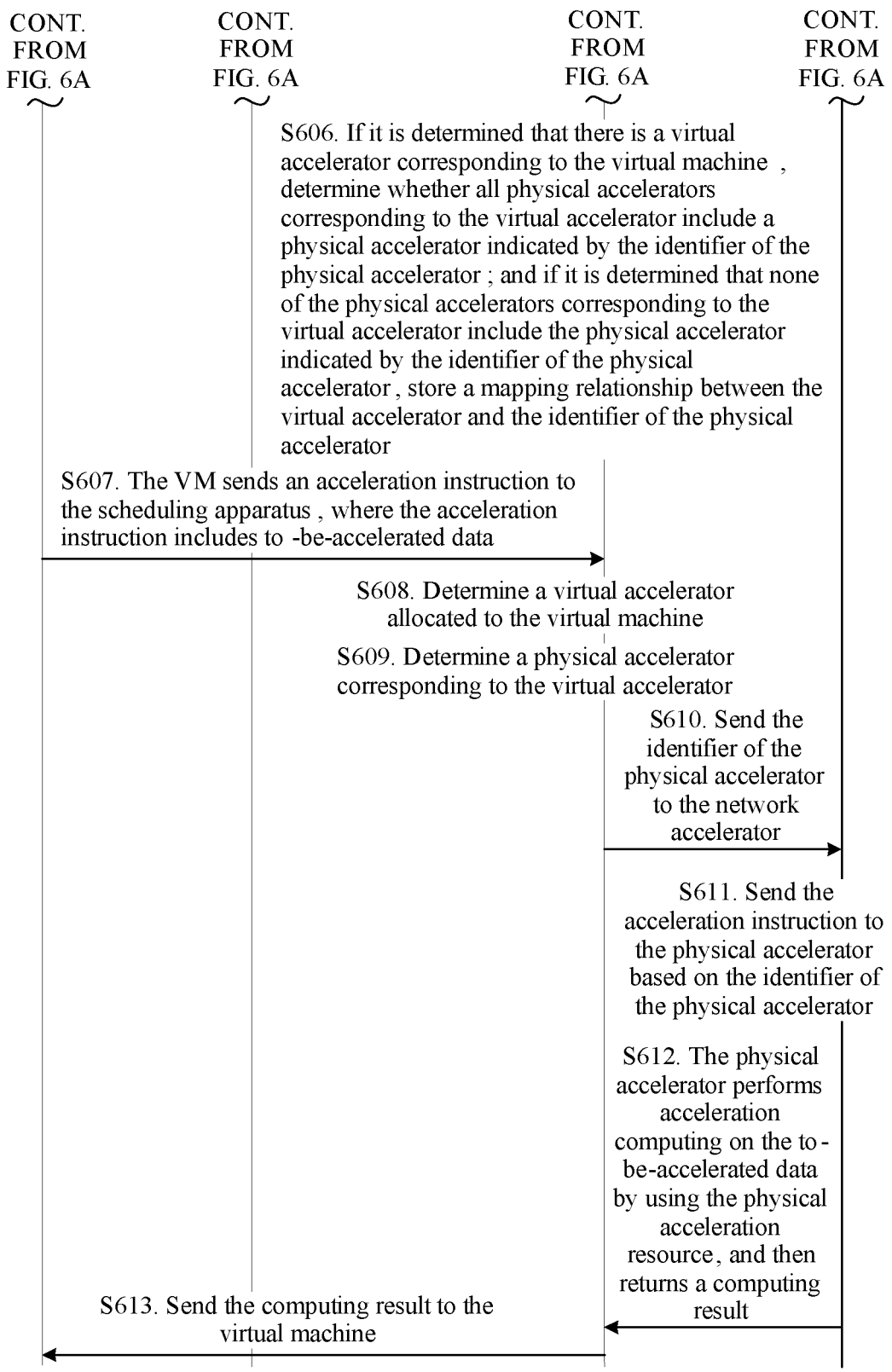

Referring to FIG. 6A and FIG. 6B, FIG. 6A and FIG. 6B are a schematic flowchart of still another acceleration resource scheduling method according to an embodiment. When a VM intends to apply for an acceleration resource, the VM may initiate an acceleration resource application request to a management node by using a client; and the management node may generate a virtual accelerator application command based on an acceleration resource requirement of the VM and resource usage of a network accelerator, and send the command to a scheduling apparatus, so as to instruct the scheduling apparatus to perform acceleration resource scheduling. Steps S601 and S607 in the method in FIG. 6A and FIG. 6B may be performed by the virtual machine in FIG. 1, FIG. 2, or FIG. 3; steps S602, S603, and S604 in the method in FIG. 6A may be performed by the management node in FIG. 1, FIG. 2, or FIG. 3, or a management node in FIG. 11 or FIG. 12, or a processing unit in a management node shown in FIG. 11, or a processor 310 in a management node shown in FIG. 12; and steps S605, S606, S608, S609, S610, and S613 in the method in FIG. 6A and FIG. 6B may be performed by the scheduling apparatus in FIG. 1, FIG. 2, or FIG. 3, or a scheduling apparatus in FIG. 7 or FIG. 8, or a processing unit in a scheduling apparatus shown in FIG. 7, or a processor 110 in a scheduling apparatus shown in FIG. 8. The method may include the following steps.

S601. A virtual machine sends an acceleration resource application request to a management node.

The acceleration resource application request includes an identifier of the virtual machine, a quantity of required physical acceleration resources allocated to the virtual machine, and a type identifier of a physical accelerator that provides the physical acceleration resource for the virtual machine.

S602. The management node determines, based on the type identifier of the physical accelerator and the quantity of the required physical acceleration resources, each network accelerator to which the at least one physical accelerator that provides the physical acceleration resource belongs.

S603. The management node generates a virtual accelerator application command.

The virtual accelerator application command includes the identifier of the virtual machine and an identifier of a physical accelerator that is in each network accelerator and that is configured to provide a physical acceleration resource for the virtual machine.

S604. The management node sends the virtual accelerator application command to the scheduling apparatus, so that the scheduling apparatus stores, based on the virtual accelerator application command, a correspondence between an identifier of a virtual accelerator and the identifier of the physical accelerator that is in each network accelerator and that is configured to provide the physical acceleration resource for the virtual machine.

The acceleration resource is allocated to the virtual accelerator of the virtual machine by using steps S601 to S604. When a user needs to delete the acceleration resource subsequently, a specific implementation is: receiving, by the management node, a physical accelerator deletion command sent by the client, and deleting a physical acceleration resource that is of the virtual machine and that needs to be deleted by the user. The physical accelerator deletion command includes an identifier of the to-be-deleted physical accelerator and the identifier of the virtual machine. The client may be application management software deployed on the virtual machine or any network communications device. After logging in to the client, the user may select the to-be-deleted physical acceleration resource based on physical acceleration resource information that corresponds to the virtual machine and that is presented in an interface of the client, where the physical acceleration resource information includes the identifier of the virtual accelerator or the identifier of the physical accelerator that has been allocated to the virtual machine. After receiving the physical accelerator deletion command sent by the user by using the client, the management node sends the physical accelerator deletion command to the scheduling apparatus, where the physical accelerator deletion command is used to instruct the scheduling apparatus to: after it is determined that there is a virtual accelerator corresponding to the virtual machine, if it is determined, based on the identifier of the physical accelerator, that all physical accelerators corresponding to the virtual accelerator include a physical accelerator indicated by the identifier of the to-be-deleted physical accelerator, delete the identifier of the to-be-deleted physical accelerator.

If the user needs to delete all physical acceleration resources provided by the virtual accelerator, the physical accelerator deletion command sent by the user by using the client further includes the identifier of the virtual accelerator. In a specific implementation, after the receiving, by the management node, a physical accelerator deletion command sent by the client, the following is further included: sending, by the management node, a virtual accelerator deletion command to the scheduling apparatus, where the virtual accelerator deletion command includes the identifier of the virtual machine and the identifier of the virtual accelerator, and the virtual accelerator deletion command is used to instruct the scheduling apparatus to: after it is determined, based on the identifier of the virtual machine, that there is a virtual accelerator indicated by the identifier of the virtual accelerator corresponding to the virtual machine, delete correspondences between the identifier of the virtual accelerator and identifiers of all physical accelerators.

The following describes a process in which the scheduling apparatus creates a virtual accelerator after receiving the virtual accelerator application command and determining, based on the identifier of the virtual machine, that there is no virtual accelerator corresponding to the virtual machine. For specific implementation, refer to step S605.

S605. If it is determined that there is no virtual accelerator corresponding to the virtual machine, the scheduling apparatus creates a virtual accelerator corresponding to the virtual machine, allocates an identifier to the virtual accelerator, and stores a correspondence between the identifier of the virtual accelerator and the identifier of the physical accelerator.

The following describes a process in which the scheduling apparatus creates a virtual accelerator after receiving the virtual accelerator application command and determining, based on the identifier of the virtual machine, that there is a virtual accelerator corresponding to the virtual machine. For specific implementation, refer to step S606.

S606. If it is determined that there is a virtual accelerator corresponding to the virtual machine, the scheduling apparatus determines whether all physical accelerators corresponding to the virtual accelerator include a physical accelerator indicated by the identifier of the physical accelerator; and if it is determined that none of the physical accelerators corresponding to the virtual accelerator include the physical accelerator indicated by the identifier of the physical accelerator, stores a mapping relationship between the virtual accelerator and the identifier of the physical accelerator.

The following describes how the scheduling apparatus provides the physical acceleration resource for the virtual machine to perform acceleration processing on to-be-accelerated data after creating the virtual accelerator. Specifically, the following steps S607 to S613 are included.

S607. The VM sends an acceleration instruction to the scheduling apparatus, where the acceleration instruction includes to-be-accelerated data. For specific implementation details, refer to step S401 shown in FIG. 4.

S608. The scheduling apparatus determines a virtual accelerator allocated to the virtual machine. For specific implementation details, refer to step S402 shown in FIG. 4.

S609. The scheduling apparatus determines a physical accelerator corresponding to the virtual accelerator.

A network accelerator at which the physical accelerator is located is the network accelerator that is to process the acceleration instruction.

S610. The scheduling apparatus sends the identifier of the physical accelerator to the network accelerator.

S611. The network accelerator sends the acceleration instruction to the physical accelerator based on the identifier of the physical accelerator.

S612. The physical accelerator performs acceleration computing on the to-be-accelerated data by using the physical acceleration resource, and then returns a computing result to the scheduling apparatus.

S613. The scheduling apparatus sends the computing result to the virtual machine.

An embodiment further discloses a resource scheduling method that is performed by a management node. For main steps of the method, refer to the descriptions in the embodiments in FIG. 5A to FIG. 6B. Details are not described herein again.

Figure 7:
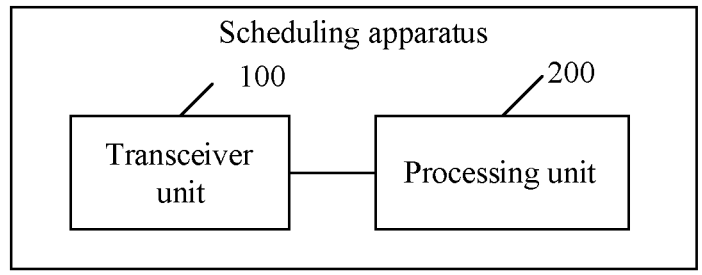
FIG. 7 is a schematic structural diagram of a scheduling apparatus according to an embodiment.

Referring to FIG. 7 which is a schematic structural diagram of a scheduling apparatus according to an embodiment. The scheduling apparatus is applied to an acceleration system, where the acceleration system includes a computing node and at least one network accelerator, the computing node includes a virtual machine and the scheduling apparatus, and the network accelerator includes at least one physical accelerator; and the scheduling apparatus includes a transceiver unit 100 and a processing unit 200.

The transceiver unit 100 is configured to receive an acceleration instruction sent by the virtual machine, where the acceleration instruction includes to-be-accelerated data.

The processing unit 200 is configured to determine a virtual accelerator allocated to the virtual machine, where the virtual accelerator is mapping, on the scheduling apparatus, of a physical acceleration resource allocated to the virtual machine, and the physical acceleration resource includes at least some physical acceleration resources in the at least one physical accelerator in the at least one network accelerator. The processing unit 200 is further configured to: determine, based on the virtual accelerator, a network accelerator that is to process the acceleration instruction, and send the acceleration instruction to the network accelerator, so that the network accelerator sends the acceleration instruction to a physical accelerator that is to process the acceleration instruction.

The transceiver unit 100 is further configured to: receive a computing result that is returned after the physical accelerator performs acceleration computing on the to-be-accelerated data by using the physical acceleration resource; and send the computing result to the virtual machine.

Optionally, when determining, based on the virtual accelerator, the network accelerator that is to process the acceleration instruction, the processing unit 200 is further configured to: determine an object accelerator corresponding to the virtual accelerator, where a network accelerator at which the object accelerator is located is the network accelerator that is to process the acceleration instruction.

After determining, based on the virtual accelerator, the network accelerator that is to process the acceleration instruction, the processing unit 200 is further configured to: send an identifier of the object accelerator to the network accelerator, so that the network accelerator determines, based on the identifier of the object accelerator, a physical accelerator corresponding to the object accelerator, and sends the acceleration instruction to the physical accelerator.

Optionally, when determining, based on the virtual accelerator, the network accelerator that is to process the acceleration instruction, the processing unit 200 is further configured to: determine a physical accelerator corresponding to the virtual accelerator, where a network accelerator at which the physical accelerator is located is the network accelerator that is to process the acceleration instruction.

After determining, based on the virtual accelerator, the network accelerator that is to process the acceleration instruction, the processing unit 200 is further configured to: send an identifier of the physical accelerator to the network accelerator, so that the network accelerator sends the acceleration instruction to the physical accelerator based on the identifier of the physical accelerator.

Optionally, before receiving the acceleration instruction sent by the virtual machine, the transceiver unit 100 is further configured to: receive a virtual accelerator application command sent by a management node, where the virtual accelerator application command includes the identifier of the object accelerator and an identifier of the virtual machine.

The processing unit 200 is further configured to: if it is determined that there is no virtual accelerator corresponding to the virtual machine, create a virtual accelerator corresponding to the virtual machine, and allocate an identifier to the virtual accelerator; and store a correspondence between the identifier of the virtual accelerator and the identifier of the object accelerator.

Optionally, before receiving the acceleration instruction sent by the virtual machine, the transceiver unit 100 is further configured to: receive a virtual accelerator application command sent by a management node, where the virtual accelerator application command includes the identifier of the physical accelerator and an identifier of the virtual machine.

The processing unit 200 is further configured to: if it is determined that there is no virtual accelerator corresponding to the virtual machine, create a virtual accelerator corresponding to the virtual machine, and allocate an identifier to the virtual accelerator; and store a correspondence between the identifier of the virtual accelerator and the identifier of the physical accelerator.

Optionally, the transceiver unit 100 is further configured to: receive a virtual accelerator application command sent by the management node, where the virtual accelerator application command includes the identifier of the object accelerator and an identifier of the virtual machine.

The processing unit 200 is further configured to: if it is determined that there is a virtual accelerator corresponding to the virtual machine, determine whether all object accelerators corresponding to the virtual accelerator include an object accelerator indicated by the identifier of the object accelerator; and if it is determined that none of the object accelerators corresponding to the virtual accelerator include the object accelerator indicated by the identifier of the object accelerator, store a mapping relationship between the virtual accelerator and the identifier of the object accelerator.

Optionally, the transceiver unit 100 is further configured to: receive a virtual accelerator application command sent by the management node, where the virtual accelerator application command includes the identifier of the physical accelerator and an identifier of the virtual machine.

The processing unit 200 is further configured to: if it is determined that there is a virtual accelerator corresponding to the virtual machine, determine whether all physical accelerators corresponding to the virtual accelerator include a physical accelerator indicated by the identifier of the physical accelerator; and if it is determined that none of the object accelerators corresponding to the virtual accelerator include the physical accelerator indicated by the identifier of the physical accelerator, store a mapping relationship between the virtual accelerator and the identifier of the physical accelerator.

Optionally, the transceiver unit 100 is further configured to: receive an object accelerator deletion command sent by the management node, where the object accelerator deletion command includes the identifier of the virtual machine and the identifier of the object accelerator.

The processing unit 200 is further configured to: if it is determined that there is a virtual accelerator corresponding to the virtual machine, determine, based on the identifier of the object accelerator, whether all object accelerators corresponding to the virtual accelerator include an object accelerator indicated by the identifier of the object accelerator; and if it is determined that all the object accelerators corresponding to the virtual accelerator include the object accelerator indicated by the identifier of the object accelerator, delete the identifier of the object accelerator.

Optionally, the transceiver unit 100 is further configured to: receive a physical accelerator deletion command sent by the management node, where the physical accelerator deletion command includes the identifier of the virtual machine and the identifier of the physical accelerator.

The processing unit 200 is further configured to: if it is determined that there is a virtual accelerator corresponding to the virtual machine, determine, based on the identifier of the physical accelerator, whether all physical accelerators corresponding to the virtual accelerator include a physical accelerator indicated by the identifier of the physical accelerator; and if it is determined that all the physical accelerators corresponding to the virtual accelerator include the physical accelerator indicated by the identifier of the physical accelerator, delete the identifier of the physical accelerator.

Optionally, the acceleration instruction further includes the identifier of the virtual machine; the processing unit 200 is further configured to pre-store a correspondence between the identifier of the virtual machine and the identifier of the virtual accelerator; and when determining the virtual accelerator allocated to the virtual machine, the processing unit 200 is further configured to: determine, based on the correspondence between the identifier of the virtual machine and the identifier of the virtual accelerator, the virtual accelerator corresponding to the virtual machine.

Optionally, the acceleration instruction further includes the identifier of the virtual accelerator, and the virtual machine pre-stores a correspondence between the identifier of the virtual machine and the identifier of the virtual accelerator; and when determining the virtual accelerator allocated to the virtual machine, the processing unit 200 is further configured to: determine, based on the identifier of the virtual accelerator, the virtual accelerator corresponding to the virtual machine.

Functions of the transceiver unit 100 in the scheduling apparatus shown in FIG. 7 correspond to steps S401, S405, and S406 in FIG. 4, or steps S507, S510, S513, S515, and S516 in FIG. 5A and FIG. 5B, or steps S604, S607, S610, S612, and S613 in FIG. 6A and FIG. 6B. The transceiver unit 100 can perform actions in steps S401, S405, and S406 in FIG. 4, or steps S507, S510, S513, S515, and S516 in FIG. 5A and FIG. 5B, or steps S604, S607, S610, S612, and S613 in FIG. 6A and FIG. 6B. Functions of the processing unit 200 in the scheduling apparatus shown in FIG. 7 correspond to steps S402 and S403 in FIG. 4, or steps S508, S509, S511, S512, and S516 in FIG. 5A and FIG. 5B, or steps S605, S606, S608, and S609 in FIG. 6A and FIG. 6B. The processing unit 200 can perform actions in steps S402 and S403 in FIG. 4, or steps S508, S509, S511, S512, and S516 in FIG. 5A and FIG. 5B, or steps S605, S606, S608, and S609 in FIG. 6A and FIG. 6B.

In addition, the scheduling apparatus shown in FIG. 7 may be specifically an apparatus having a control function and disposed in the computing node.

In addition, the scheduling apparatus shown in FIG. 7 may be an independent device that is disposed outside the computing node, or may be a module that is directly integrated into the computing node, and is configured to schedule an acceleration resource based on an acceleration requirement of the virtual machine on the computing node.

Figure 8:
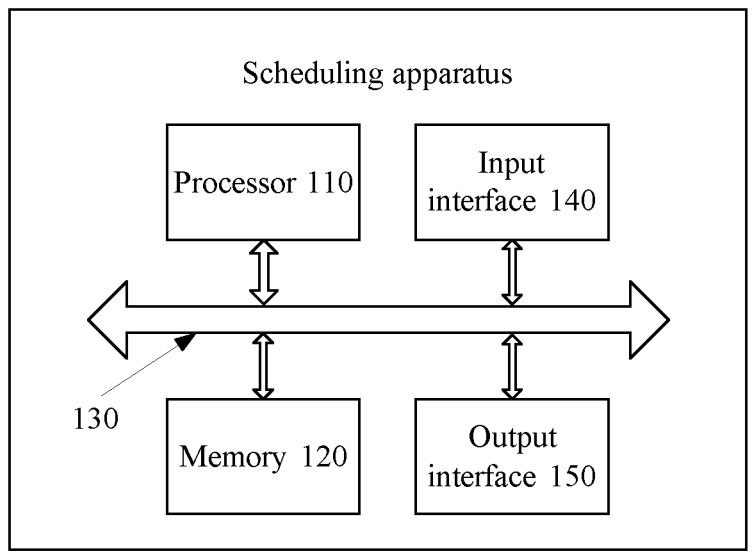
FIG. 8 is a schematic structural diagram of another scheduling apparatus according to an embodiment.

Referring to FIG. 8, FIG. 8 is a schematic structural diagram of another scheduling apparatus according to an embodiment. As shown in FIG. 8, the apparatus may include a processor 110, a memory 120, and a bus 130, where the processor 110 and the memory 120 are connected by using the bus 130, the memory 120 is configured to store an instruction, and the processor 110 is configured to execute the instruction stored by the memory 120, to implement corresponding steps performed by the scheduling apparatus in the methods in FIG. 4 to FIG. 6B.

Further, the apparatus may further include an input interface 140 and an output interface 150, where the processor 110, the memory 120, the input interface 140, and the output interface 150 may be connected by using the bus 130.

The processor 110 is configured to execute an instruction stored by the memory 120, to control the input interface 140 to receive a signal, and control the output interface 150 to send a signal, thereby completing the steps that are performed by a controller in the foregoing method. The input interface 140 and the output interface 150 may be same or different physical entities, and may be collectively referred to as an input/output interface when being the same physical entities. The memory 120 may be integrated into the processor 110, or may be separate from the processor 110.

In an implementation, functions of the input interface 140 and the output interface 150 may be implemented by using a transceiver circuit or a dedicated transceiver chip. The processor 110 may be implemented by using a dedicated processing chip, processing circuit, or processor, or a general-purpose chip.

In another implementation, the apparatus provided in this embodiment may be implemented by using a general-purpose computer. To be specific, program code that implements functions of the processor 110, the input interface 140, and the output interface 150 is stored in the memory, and a general-purpose processor implements the functions of the processor 110, the input interface 140, and the output interface 150 by executing the code in the memory.

For concepts, explanations, and detailed descriptions about the apparatus that are related to the technical solution provided in this embodiment and other steps, refer to descriptions of the content in the foregoing method or other embodiments. Details are not described herein again.

A person skilled in the art may understand that, for ease of description, FIG. 7 merely shows a memory and a processor. In an actual controller, there may be a plurality of processors and memories. The memory may also be referred to as a storage medium, a storage device, or the like. This is not limited in this embodiment.

It should be noted that, the scheduling apparatus may be integrated into the computing node; or the scheduling apparatus may exist independently, and an interface that is connected to the computing node is configured to implement data transmission with the computing node. For example, the scheduling apparatus may be configured as an embedded card, a PCIe interface is configured for the scheduling apparatus to be connected to a PCIe interface of the computing node, and a network interface is configured for the scheduling apparatus to be connected to a management node and a network accelerator in a network or a cloud, to implement data exchange between two ends. In addition, an independently disposed processor, memory, and the like implement storage and execution of the program code, thereby implementing the method steps that are performed by the scheduling apparatus in the method embodiments.

Figure 9:
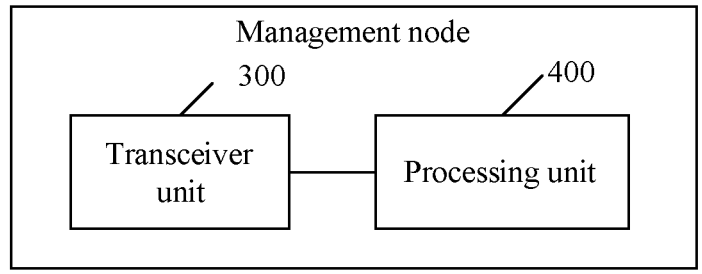
FIG. 9 is a schematic structural diagram of a management node according to an embodiment.

Referring to FIG. 9, FIG. 9 is a schematic structural diagram of a management node according to an embodiment. The management node is applied to an acceleration system, where the acceleration system includes the management node, a computing node, and at least one network accelerator, the computing node includes a virtual machine and a scheduling apparatus, and the network accelerator includes at least one physical accelerator; and the management node includes: a transceiver unit 300 configured to receive an acceleration resource application request sent by the virtual machine, where the acceleration resource application request includes an identifier of the virtual machine, a quantity of required physical acceleration resources allocated to the virtual machine, and a type identifier of a physical accelerator that provides the physical acceleration resource for the virtual machine; and a processing unit 400 configured to: determine, based on the type identifier of the physical acceleration resources and the quantity of the required physical acceleration resources, each network accelerator to which the at least one physical accelerator that provides the physical acceleration resource belongs; and generate a physical acceleration resource creation command, where the physical acceleration resource creation command is used to instruct the network accelerator to create an object accelerator, and store a correspondence between an identifier of the object accelerator and an identifier of a physical accelerator that is in the network accelerator and that is configured to provide a physical acceleration resource for the virtual machine.

The transceiver unit 300 is further configured to: send the physical acceleration resource creation command to the network accelerator; and receive the identifier of the object accelerator that is sent by the network accelerator.

The processing unit 400 is further configured to: generate a virtual accelerator application command, where the virtual accelerator application command includes the identifier of the virtual machine and the identifier of the object accelerator; and send the virtual accelerator application command to the scheduling apparatus, so that the scheduling apparatus stores a correspondence between an identifier of a virtual accelerator and the identifier of the object accelerator based on the virtual accelerator application command.

Functions of the transceiver unit 300 in the management node shown in FIG. 9 correspond to steps S501, S504, S505, and S507 in FIG. 5A and FIG. 5B. The transceiver unit 300 can perform actions in steps S501, S504, S505, and S507 in FIG. 5A and FIG. 5B. Functions of the processing unit 400 in the management node shown in FIG. 9 correspond to steps S502, S503, and S506 in FIG. 5A and FIG. 5B. The processing unit 400 can perform actions in steps S502, S503, and S506 in FIG. 5A and FIG. 5B.

Figure 10:
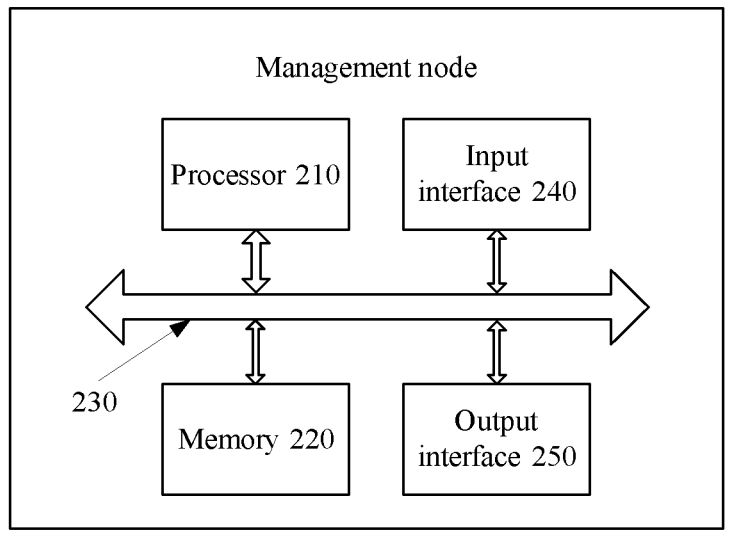
FIG. 10 is a schematic structural diagram of another management node according to an embodiment.

Referring to FIG. 10, FIG. 10 is a schematic structural diagram of another management node according to an embodiment. As shown in FIG. 10, the apparatus may include a processor 210, a memory 220, and a bus 230, where the processor 210 and the memory 220 are connected by using the bus 230, the memory 220 is configured to store an instruction, and the processor 210 is configured to execute the instruction stored by the memory 220, to implement the steps in the method corresponding to FIG. 4 or FIG. 5A and FIG. 5B.

Further, the management node may further include an input interface 240 and an output interface 250, where the processor 210, the memory 220, the input interface 240, and the output interface 250 may be connected by using the bus 230.

The processor 210 is configured to execute an instruction stored by the memory 220, to control the input interface 240 to receive a signal, and control the output interface 250 to send a signal, thereby completing the steps that are performed by the management node in the foregoing method. The input interface 240 and the output interface 250 may be same or different physical entities, and may be collectively referred to as an input/output interface when being the same physical entities. The memory 220 may be integrated into the processor 210, or may be separate from the processor 210.

In an implementation, functions of the input interface 240 and the output interface 250 may be implemented by using a transceiver circuit or a dedicated transceiver chip. The processor 210 may be implemented by using a dedicated processing chip, processing circuit, or processor, or a general-purpose chip.

In another implementation, the apparatus provided in this embodiment may be implemented by using a general-purpose computer. To be specific, program code that implements functions of the processor 210, the input interface 240, and the output interface 250 is stored in the memory, and a general-purpose processor implements the functions of the processor 210, the input interface 240, and the output interface 250 by executing the code in the memory.

Figure 11:
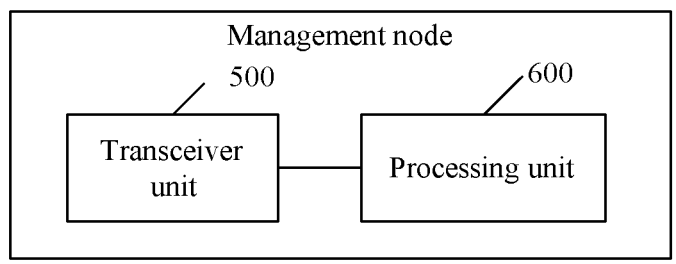
FIG. 11 is a schematic structural diagram of still another management node according to an embodiment.

Referring to FIG. 11, FIG. 11 is a schematic structural diagram of a management node according to an embodiment. The management node is applied to an acceleration system, where the acceleration system includes the management node, a computing node, and at least one network accelerator, the computing node includes a virtual machine and a scheduling apparatus, and the network accelerator includes at least one physical accelerator; and the management node includes: a transceiver unit 500 configured to receive an acceleration resource application request sent by the virtual machine, where the acceleration resource application request includes an identifier of the virtual machine, a quantity of required physical acceleration resources allocated to the virtual machine, and a type identifier of a physical accelerator that provides the physical acceleration resource for the virtual machine; and a processing unit 600 configured to: determine, based on the type identifier of the physical accelerator and the quantity of the required physical acceleration resources, each network accelerator to which the at least one physical accelerator that provides the physical acceleration resource belongs; generate a virtual accelerator application command, where the virtual accelerator application command includes the identifier of the virtual machine and an identifier of a physical accelerator that is in each network accelerator and that is configured to provide a physical acceleration resource for the virtual machine; and send the virtual accelerator application command to the scheduling apparatus, so that the scheduling apparatus stores, based on the virtual accelerator application command, a correspondence between an identifier of a virtual accelerator and the identifier of the physical accelerator that is in each network accelerator and that is configured to provide the physical acceleration resource for the virtual machine.

A function of the transceiver unit 500 in the management node shown in FIG. 11 corresponds to step S601 in FIG. 6A. The transceiver unit 500 can perform an action in step S601 in FIG. 6A. Functions of the processing unit 600 in the management node shown in FIG. 11 correspond to steps S602, S603, and S604 in FIG. 6A. The processing unit 600 can perform actions in steps S602, S603, and S604 in FIG. 6A.

Figure 12:
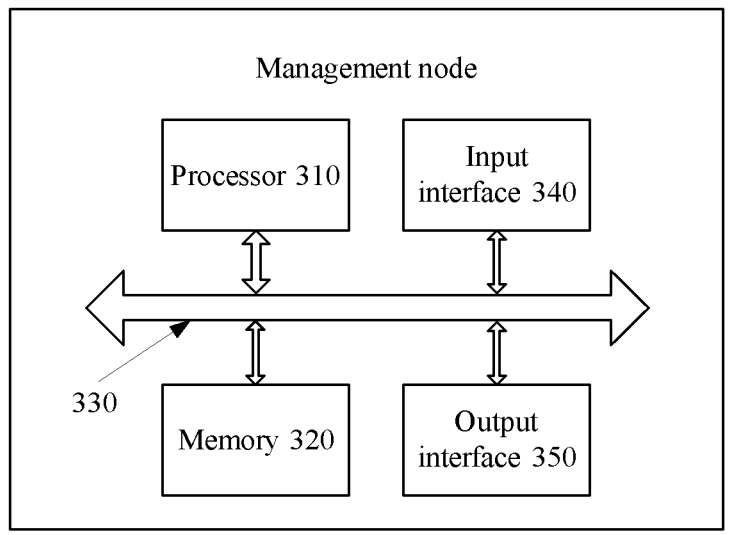
FIG. 12 is a schematic structural diagram of still another management node according to an embodiment.

Referring to FIG. 12, FIG. 12 is a schematic structural diagram of another management node according to an embodiment. As shown in FIG. 12, the apparatus may include a processor 310, a memory 320, and a bus 330, where the processor 310 and the memory 320 are connected by using the bus 330, the memory 320 is configured to store an instruction, and the processor 310 is configured to execute the instruction stored by the memory 320, to implement the steps in the method corresponding to FIG. 4 or FIG. 6A and FIG. 6B.

Further, the management node may further include an input interface 340 and an output interface 350, where the processor 310, the memory 320, the input interface 340, and the output interface 350 may be connected by using the bus 330.

The processor 310 is configured to execute an instruction stored by the memory 320, to control the input interface 340 to receive a signal, and control the output interface 350 to send a signal, thereby completing the steps that are performed by the management node in the foregoing method. The input interface 340 and the output interface 350 may be same or different physical entities, and may be collectively referred to as an input/output interface when being the same physical entities. The memory 320 may be integrated into the processor 310, or may be separate from the processor 310.

In an implementation, functions of the input interface 340 and the output interface 350 may be implemented by using a transceiver circuit or a dedicated transceiver chip. The processor 310 may be implemented by using a dedicated processing chip, processing circuit, or processor, or a general-purpose chip.

In another implementation, the apparatus provided in this embodiment may be implemented by using a general-purpose computer. To be specific, program code that implements functions of the processor 310, the input interface 340, and the output interface 350 is stored in the memory, and a general-purpose processor implements the functions of the processor 310, the input interface 340, and the output interface 350 by executing the code in the memory.

For concepts, explanations, and detailed descriptions about the management node that are related to the technical solution provided in this embodiment and other steps, refer to descriptions of the content in the foregoing method or other embodiments. Details are not described herein again.

A person skilled in the art may understand that, for ease of description, FIG. 10 and FIG. 12 merely show a memory and a processor. In an actual controller, there may be a plurality of processors and memories. The memory may also be referred to as a storage medium, a storage device, or the like. This is not limited in this embodiment.

It should be understood that, in this embodiment, the processor may be a CPU, or the processor may be another general-purpose processor, a digital signal processor (DSP), an ASIC, an FPGA, another programmable logical device, a discrete gate or a transistor logical device, a discrete hardware assembly, or the like. The general-purpose processor may be a microprocessor, or the processor may be any conventional processor or the like.

The memory may include a read-only memory and a random access memory, and provide an instruction and data for the processor. Apart of the memory may further include a non-volatile random access memory.

In addition to a data bus, the bus may further include a power bus, a control bus, a status signal bus, and the like. However, for clear description, various buses are all denoted as the bus in the figure.

In an implementation process, steps in the foregoing methods may be implemented by using a hardware integrated logic circuit in the processor or using instructions in a form of software. The steps of the method disclosed with reference to the embodiments may be directly performed by a hardware processor, or may be performed by using a combination of hardware in the processor and a software module. The software module may be located in a mature storage medium in the art, such as a random access memory, a flash memory, a read-only memory, a programmable read-only memory or an electrically erasable programmable memory, or a register. The storage medium is located in the memory, and the processor reads information in the memory and completes the steps in the foregoing methods in combination with hardware of the processor. To avoid repetition, details are not described herein again.

According to the method provided in this embodiment, an embodiment further provides a system, including the foregoing management node, a computing node, and at least one network accelerator, where the computing node includes a virtual machine and the foregoing scheduling apparatus, and the network accelerator includes at least one physical accelerator. For functions of the devices and an interaction process, refer to descriptions in the foregoing embodiments. Details are not described herein again.

It should be understood that sequence numbers of the foregoing processes do not mean execution sequences in various embodiments. The execution sequences of the processes should be determined according to functions and internal logic of the processes, and should not be construed as any limitation on the implementation processes of the embodiments.

A person of ordinary skill in the art may be aware that, with reference to descriptions in the embodiments disclosed in this specification, various illustrative logical blocks and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

In the embodiments provided, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, mutual couplings, direct couplings, or communication connections that are displayed or discussed herein may be indirect couplings or communication connections that are implemented by some interfaces, apparatuses, or units, and may be electrical, mechanical, or in other forms.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partly generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, digital versatile disc (DVD)), a semiconductor medium (for example, a solid-state disk (SSD)), or the like.

The foregoing descriptions are merely specific implementations, but are not intended to limit the protection scope of this disclosure. Any variation or replacement readily figured out by a person skilled in the art within the technical scope disclosed shall fall within the protection scope of this disclosure. Therefore, the protection scope of this disclosure shall be subject to the protection scope of the claims.

What is claimed is:

1. A system comprising:
   a computing device comprising:
      a scheduling apparatus;
      a virtual machine configured to generate data of an application running on the virtual machine; and
      a hypervisor configured to create the virtual machine;
   a plurality of physical accelerators, wherein the physical accelerators form a physical acceleration resource, and wherein the physical acceleration resource comprises a first physical acceleration resource; and
   a management server configured to:
      connect to the computing device and the physical accelerators through a network; and
      send to the scheduling apparatus a command for allocating the first physical acceleration resource from the physical acceleration resource to the virtual machine after the virtual machine is created,
   wherein the computing device, the physical accelerators, and the management server are separate components and are configured to connect to a network device for communication with each other,
   wherein the scheduling apparatus is configured to transfer the data to the first physical acceleration resource, and
   wherein the first physical acceleration resource is configured to:
      receive the data from the scheduling apparatus; and
      process the data to obtain a result.

2. The system of claim 1, wherein the physical accelerators are remote from the virtual machine.

3. The system of claim 1, wherein the physical acceleration resource is further configured to send the result to the virtual machine.

4. The system of claim 1, wherein the first physical acceleration resource is from one or more of the physical accelerators.

5. The system of claim 1, wherein the first physical acceleration resource is from a portion of one of the physical accelerators.

6. The system of claim 1, wherein the scheduling apparatus is further configured to record the first physical acceleration resource.

7. The system of claim 6, wherein the scheduling apparatus is further configured to release, in response to an instruction, the first physical acceleration resource.

8. The system of claim 1, wherein the physical accelerators are heterogeneous and are graphic processing units (GPUs), field-programmable gate arrays (FPGAs), or application-specific integrated circuits (ASICs).

9. The system of claim 1, wherein the scheduling apparatus is deployed in the virtual machine, another virtual machine, or a container.

10. The system of claim 1, wherein the physical accelerators are located in distributed servers.

11. The system of claim 1, further comprising additional virtual machines configured to share the physical accelerators.

12. The system of claim 11, wherein the additional virtual machines are further configured to run applications, and wherein the applications are configured to share the physical accelerators.

13. An acceleration method comprising:
creating, by a hypervisor of a computing device, a virtual machine;
sending, by a management server to a scheduling apparatus in the computing device, a command for allocating a first physical acceleration resource from a physical acceleration resource to the virtual machine after the virtual machine is created, wherein the physical acceleration resource is formed from a plurality of physical accelerators, wherein the computing device, the physical accelerators, and the management server are separate components and are configured to connect to a network device for communication with each other, and wherein the management server is connected to the computing device and the physical accelerators through a network;
transferring, by the scheduling apparatus to the first physical acceleration resource, data of the virtual machine;
receiving, by the first physical acceleration resource, the data; and
processing, by the first physical acceleration resource, the data to obtain a result.

14. The method of claim 13, further comprising sending, by the first physical acceleration resource to the virtual machine, the result.

15. The method of claim 13, further comprising recording, by the scheduling apparatus, the first physical acceleration resource.

16. The method of claim 15, further comprising releasing, by the scheduling apparatus in response to an instruction, the physical acceleration resource.

17. The method of claim 13, further comprising sharing, by additional virtual machines, the physical accelerators.

18. A computer program product comprising instructions that are stored on a non-transitory computer-readable medium and that, when executed by one or more processors, cause an acceleration system to:
create, by a hypervisor of a computing device, a virtual machine;
send, by a management server to a scheduling apparatus in the computing device, a command for allocating a first physical acceleration resource from a physical acceleration resource to the virtual machine after the virtual machine is created, wherein the physical acceleration resource is formed from a plurality of physical accelerators in an acceleration resource cluster, wherein the computing device, the physical accelerators, and the management server are separate components and are configured to connect to a network device for communication with each other, and wherein the management server is connected to the computing device and the physical accelerators through a network;
transfer, by the scheduling apparatus to the first physical acceleration resource, data of the virtual machine;
receive, by the first physical acceleration resource, the data; and
process, by the first physical acceleration resource, the data to obtain a result.

19. The computer program product of claim 18, wherein the first physical acceleration resource is from a portion of one of the physical accelerators.

20. The computer program product of claim 18, wherein the instructions, when executed by the one or more processors, further cause the acceleration system to release, by the scheduling apparatus in response to an instruction, the first physical acceleration resource.

21. The computer program product of claim 18, wherein the acceleration resource cluster is remote from the virtual machine.

22. The computer program product of claim 18, wherein the instructions, when executed by the one or more processors further cause the acceleration system to send the result to the virtual machine.

23. The computer program product of claim 18, wherein the first physical acceleration resource is from one or more of the physical accelerators.

24. The computer program product of claim 18, wherein the instructions, when executed by the one or more processors further cause the acceleration system to record the first physical acceleration resource.

25. The computer program product of claim 18, wherein the physical accelerators are heterogeneous and are graphic processing units (GPUs), field-programmable gate arrays (FPGAs), or application-specific integrated circuits (ASICs).

26. The computer program product of claim 18, wherein the scheduling apparatus is deployed in the virtual machine, another virtual machine, or a container.

27. The computer program product of claim 18, wherein the physical accelerators are located in distributed servers.

28. The computer program product of claim 27, wherein the instructions, when executed by the one or more processors further cause the acceleration system to run applications, and wherein the applications are configured to share the acceleration resource cluster.

* * * * *

UNITED STATES PATENT AND TRADEMARK OFFICE
CERTIFICATE OF CORRECTION

| | | |
|---|---|---|
| PATENT NO. | : 12,224,903 B2 | Page 1 of 1 |
| APPLICATION NO. | : 17/738218 | |
| DATED | : February 11, 2025 | |
| INVENTOR(S) | : Xiaolin Jia and Junjie Wang | |

It is certified that error appears in the above-identified patent and that said Letters Patent is hereby corrected as shown below:

On the Title Page

Page 2, item (56) References Cited, Foreign Patent Documents: "CN 105159753 9/2015" should read "CN 105159753 A 12/2015".

Signed and Sealed this
Fifteenth Day of April, 2025

Coke Morgan Stewart
*Acting Director of the United States Patent and Trademark Office*